United States Patent
Mishra et al.

(10) Patent No.: US 12,174,807 B2
(45) Date of Patent: Dec. 24, 2024

(54) OUTLIER DETECTION FOR STREAMING DATA

(71) Applicant: Amazon Technologies, Inc., Seattle, WA (US)

(72) Inventors: Nina Mishra, Pleasanton, CA (US); Daniel Blick, Mountain View, CA (US); Sudipto Guha, Jersey City, CA (US); Okke Joost Schrijvers, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/549,395

(22) Filed: Dec. 13, 2021

(65) Prior Publication Data

US 2022/0100721 A1 Mar. 31, 2022

Related U.S. Application Data

(63) Continuation of application No. 14/990,175, filed on Jan. 7, 2016, now Pat. No. 11,232,085.

(51) Int. Cl.
*G06F 16/00* (2019.01)
*G06F 16/215* (2019.01)
(Continued)

(52) U.S. Cl.
CPC ........... *G06F 16/215* (2019.01); *G06N 5/01* (2023.01); *G06N 20/00* (2019.01); *G06F 16/2465* (2019.01)

(58) Field of Classification Search
CPC .................................. G06N 20/00; G06N 5/00
See application file for complete search history.

(56) References Cited

U.S. PATENT DOCUMENTS 6,523,019 B1 * 2/2003 Borthwick ............. G06N 20/00
706/45
6,889,218 B1 5/2005 Nassehi
(Continued)

FOREIGN PATENT DOCUMENTS

CN 101802869 A 8/2010
CN 102066980 A 5/2011
(Continued)

OTHER PUBLICATIONS

Outlier Detection Techniques over Streaming Data in Data Mining, Chandore et al., (Year: 2013).*

(Continued)

*Primary Examiner* — Jean M Corrielus
(74) *Attorney, Agent, or Firm* — S. Scott Foster; Kowert, Hood, Munyon, Rankin & Goetzel, P.C.

(57) ABSTRACT

Random cut trees are generated with respective to respective samples of a baseline set of data records of a data set for which outlier detection is to be performed. To construct a particular random cut tree, an iterative splitting technique is used, in which the attribute along which a given set of data records is split is selected based on its value range. With respect to a newly-received data record of the stream, an outlier score is determined based at least partly on a potential insertion location of a node representing the data record in a particular random cut tree, without necessarily modifying the random cut tree.

20 Claims, 14 Drawing Sheets

(51) Int. Cl.
*G06N 5/01* (2023.01)
*G06N 20/00* (2019.01)
*G06F 16/2458* (2019.01)

(56) References Cited

U.S. PATENT DOCUMENTS

| | | | |
|---|---|---|---|
| 7,050,932 B2 | 5/2006 | Selby et al. | |
| 7,296,018 B2 | 11/2007 | Abe et al. | |
| 7,565,335 B2 | 7/2009 | Tang et al. | |
| 8,140,421 B1* | 3/2012 | Humphries | G06Q 50/16 705/40 |
| 8,688,614 B2* | 4/2014 | Choe | G06F 16/215 706/48 |
| 8,949,158 B2* | 2/2015 | Borthwick | G06N 7/01 706/12 |
| 9,516,053 B1* | 12/2016 | Muddu | G06F 16/9024 |
| 10,417,201 B2* | 9/2019 | Graham | G06Q 30/02 |
| 10,419,450 B2* | 9/2019 | Muddu | H04L 43/062 |
| 10,560,465 B2* | 2/2020 | Ghare | H04L 43/028 |
| 11,232,085 B2* | 1/2022 | Mishra | G06N 5/01 |
| 2002/0154118 A1 | 10/2002 | McCarthy et al. | |
| 2003/0229641 A1* | 12/2003 | Kamath | G06F 18/24323 |
| 2004/0181501 A1* | 9/2004 | Burdick | G06F 16/215 |
| 2007/0239636 A1* | 10/2007 | Tang | G06N 7/01 706/20 |
| 2008/0118124 A1 | 5/2008 | Madabhushi et al. | |
| 2010/0175124 A1 | 7/2010 | Miranda | |
| 2010/0250596 A1* | 9/2010 | Fan | G06F 16/215 707/E17.039 |
| 2011/0113009 A1 | 5/2011 | Gupta et al. | |
| 2012/0054184 A1 | 3/2012 | Masud et al. | |
| 2012/0259865 A1* | 10/2012 | Lakshmanan | G06F 16/215 707/E17.014 |
| 2013/0066900 A1* | 3/2013 | Narasimhan | G06F 16/215 707/769 |
| 2013/0212103 A1* | 8/2013 | Cao | G06F 16/215 707/E17.046 |
| 2014/0143186 A1 | 5/2014 | Bala | |
| 2014/0156649 A1 | 6/2014 | Bhattacharjee et al. | |
| 2015/0134626 A1* | 5/2015 | Theimer | G06F 11/3055 707/693 |
| 2015/0199352 A1* | 7/2015 | Bush | G06F 16/24558 707/747 |
| 2015/0261886 A1* | 9/2015 | Wu | G06F 16/9024 707/798 |
| 2015/0379426 A1* | 12/2015 | Steele | G06N 5/025 706/12 |
| 2015/0379429 A1 | 12/2015 | Lee et al. | |
| 2015/0379430 A1* | 12/2015 | Dirac | G06N 20/00 706/12 |
| 2017/0063899 A1* | 3/2017 | Muddu | H04L 43/00 |
| 2017/0063900 A1* | 3/2017 | Muddu | G06F 16/24578 |
| 2017/0063901 A1* | 3/2017 | Muddu | H04L 63/1408 |
| 2017/0063902 A1* | 3/2017 | Muddu | G06F 16/444 |
| 2017/0063903 A1* | 3/2017 | Muddu | H04L 41/22 |
| 2017/0063904 A1* | 3/2017 | Muddu | G06N 5/022 |
| 2017/0063905 A1* | 3/2017 | Muddu | G06N 5/022 |
| 2017/0063906 A1* | 3/2017 | Muddu | G06F 16/9024 |
| 2017/0063907 A1* | 3/2017 | Muddu | G06F 40/134 |
| 2017/0063908 A1* | 3/2017 | Muddu | G06F 16/285 |
| 2017/0063909 A1* | 3/2017 | Muddu | H04L 63/20 |
| 2017/0063910 A1* | 3/2017 | Muddu | G06F 3/0482 |
| 2017/0063911 A1* | 3/2017 | Muddu | G06N 20/20 |
| 2017/0063912 A1* | 3/2017 | Muddu | H04L 43/045 |

FOREIGN PATENT DOCUMENTS

| | | |
|---|---|---|
| CN | 102360378 | 2/2012 |
| CN | 102729664 A | 10/2012 |
| CN | 103020222 A | 4/2013 |
| JP | H0261769 | 3/1990 |
| JP | 2004349846 | 12/2004 |

OTHER PUBLICATIONS

An overview of anomaly detection techniques—Existing solution and latest technological trends, Animesh et al., (Year: 2007).*
Tracking down software bugs using automatic anomaly detection, Sudheendra et al., (Year: 2002).*
Network Anomaly Detection—Methods, Systems and Tools, Monowar et al., (Year: 2013).*
Mining anomalies using traffic feature distributions, Anukool et al., (Year: 2005).*
Finding Hyperspectral Anomalies Using Multivariate Outlier Detection, Smetek et al., (Year: 2007).*
Leonid Kalinichenko, et al., "Methods for Anomaly Detection: a Survey", Proceedings of the 16th All-Russian Conference Digital Libraries: Advance Methods and Technologies, Digital Collections (RCDL-2014), Oct. 13-16, 2014, pp. 20-25.
Andrew Emmott, et al., "Systematic Construction of Anomaly Detection Benchmarks from Real Data", ACM Transactions on Knowledge Discovery from Data, Feb. 2015, pp. 1-27.
Pavlos S. Efraimidis, et al., "Weighted Random Sampling", Elsevier, Information Processing Letters, vol. 97, Issue 5, Mar. 16, 2006, pp. 181-185.
Frank Den Hollander, "Probability Theory: The Coupling Method", Retrieved from URL: http://websites.math.leidenuniv.nl/probability/lecturenotes/CouplingLectures.pdf, pp. 1-73.
Vladimir Vovk, et al., "Testing Exchangeability On-Line", Proceedings of the Twentieth International Conference on Machine Learning (ICML-2003), 2003, pp. 1-8.
Swee Chuan Tan, et al., "Fast Anomaly Detection for Streaming Data", IJCAI Proceedings of the Twenty-Second International Joint Conference on Artificial Intelligence, 2011, pp. 1511-1516.
Amazon Kinesis Developer Guide, Amazon Web Services, API Version, Dec. 2, 2013, pp. 1-51.
Amazon Machine Learning Developer Guide, Amazon Web Services, Version Latest Dec. 10, 2015, pp. 1-141.
Charu C. Aggarwal, "Outlier Analysis", In Data Mining, Springer International Publishing, 2015, pp. 237-263.
Jeffrey Scott Vitter, "Random Sampling with a Reservoir", ACM Transactions on Mathematical Software, vol. 11, No. 1, Mar. 1985, pp. 37-57.
Fei Tony Liu, et al., "Isolation-based Anomaly Detection", ACM Transactions on Knowledge Discovery from Data (TKDD), vol. 6, No. 1, Mar. 2012, pp. 1-44.
U.S. Appl. No. 14/319,902, filed Jun. 30, 2014, Leo Parker Dirac, et al.
U.S. Appl. No. 14/077,173, filed Nov. 11, 2013, Marvin Michael Theimer et al.
Fei Tony Liu et al, "Isolation Forest", 2008 Eighth IEEE International Conference on Data Mining, Dated Dec. 19, 2008, pp. 413-422.
Office Action from Japanese Application No. 2018-535351, (English translation and Japanese version), dated Jul. 16, 2019, pp. 1-7.
International Search Report and Written Opinion from PCT/US2017/012602, Date of mailing Mar. 17, 2017, Amazon Technologies, Inc., pp. 1-16.
Matthias Reif, et al., "Anomaly Detection by Combining Decision Trees and Parametric Densities", 19th International Conference on Pattern Recognition, 2008: ICPR 2008; Dec. 8-11, 2008, pp. 1-4.
Sridhar Ramaswamy, et al., "Efficient Algorithms for Mining Outliers from Large Data Sets", SIGMOD Record, ACM, vol. 29, No. 2, May 16, 2000, pp. 427-438.
Victoria J. Hodge, et al., "A Survey of Outlier Detection Methodologies", Artificial Intelligence Review 22; 2004, pp. 85-126.
U.S. Appl. No. 15/153,712, filed May 12, 2016, Rajeev Ramnarain Rastogi.
Moreira et al., "Extraccao de Conhecimento e Aprendizagem Computacional—Knowledge Extraction and Machine Learning", published at least prior to 2012, archived Mar. 29, 2014.
Moreira et al., "Decision Trees", Published at least prior to 2012.
Notice of Allowance mailed Feb. 14, 2022 in Chinese patent

(56) References Cited

OTHER PUBLICATIONS application No. 201780005917.2, Amazon Technologies, Inc., pp. 1-6 (including translation).

* cited by examiner

OUTLIER DETECTION FOR STREAMING DATA

This application is a continuation of U.S. patent application Ser. No. 14/990,175 filed Jan. 7, 2016, which is hereby incorporated by reference herein in its entirety.

BACKGROUND

As the costs of data storage have declined over the years, and as the ability to interconnect various elements of the computing infrastructure has improved, more and more data pertaining to a wide variety of applications can potentially be collected and analyzed. The analysis of data collected from sensors embedded at various locations within airplane engines, automobiles, health monitoring devices or complex machinery may be used for numerous purposes such as preventive maintenance, proactive health-related alerts, improving efficiency and lowering costs. Streaming data collected from an online retailer's websites can be used to make more intelligent decisions regarding the quantities of different products which should be stored at different warehouse locations, and so on. Data collected about machine servers may also be analyzed to prevent server failures.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine can be thought of as a software simulation acting as a distinct logical computing system that provides users with the illusion that they are the sole operators and administrators of a given hardware computing resource, while also providing application isolation and security among the various virtual machines. In addition to computing platforms, some large organizations also provide various types of storage services built using virtualization technologies. Using such storage services, large amounts of streaming data can be stored with desired availability and durability levels in a cost-effective manner, with a given physical storage device potentially being used to hold data records of many different service customers.

As the volumes at which streaming data can be produced increase, the need for analysis tools that work on streaming data has also increased. For example, for some security-related applications or health-related applications, the ability to identify data outliers (i.e., unusual data records or data patterns) fairly quickly may be critical. Unfortunately, many of the machine learning and statistical algorithms which have been developed over the years for such tasks were designed primarily with static data sets in mind. As a result, identifying anomalous data efficiently within high-volume streams remains a challenging problem.

Figure 1:
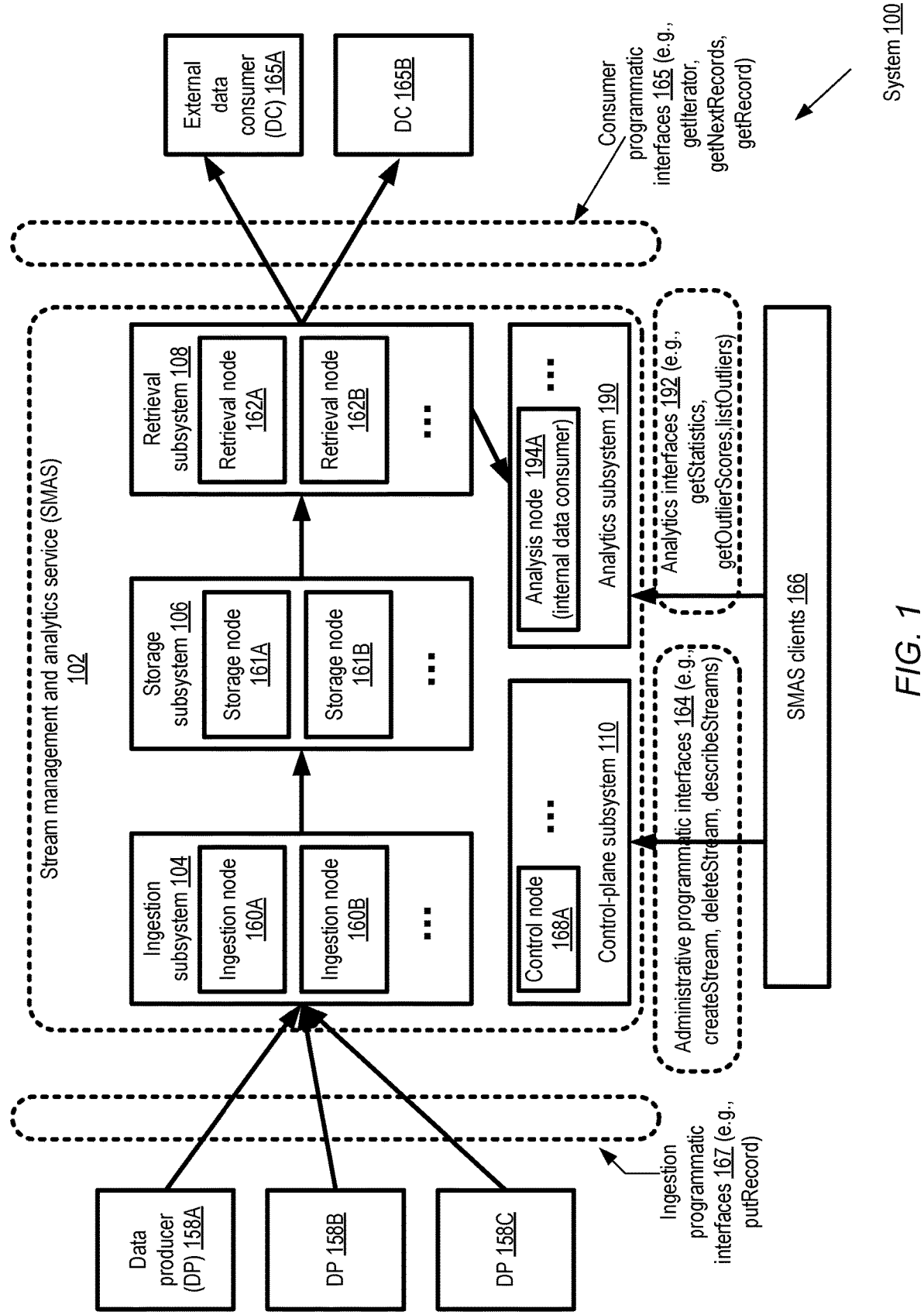
FIG. 1 illustrates an example system environment in which outlier detection may be performed on streaming data records, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for detecting outliers or anomalous records in streaming data sets are described. The terms "stream" or "streaming data set", as used herein, refer to a sequence of records that may be generated by one or more data producers and accessed by zero or more data consumers, where each record is assumed to be a sequence of bytes representing values of one or more attributes. The records of a stream may also be referred to as observation records, observations, points, or data records herein, and the data producers may be referred to as streaming data sources. A stream management and analytics service (SMAS) may provide programmatic interfaces (e.g., application programming interfaces (APIs), web pages or web sites, graphical user interfaces, or command-line tools) to enable the creation, configuration and deletion of streams. The programmatic interfaces may also enable the submission, storage, analysis, transformation and/or retrieval of stream data records in some embodiments. Dynamically provisioned sets of compute, storage and networking resources may be used to implement the service in some such embodiments, based for example on various partitioning policies that allow the stream management workload to be distributed in a scalable fashion among numerous service components.

In at least some embodiments clients of the SMAS may request the detection of unusual or anomalous observation records in a specified stream using the SMAS programmatic interfaces. (The terms "outlier" and "anomaly" may be used synonymously herein to refer to such records.) In response to such a request, the service may provide the results of applying an efficient outlier detection algorithm which uses a random cut forest-based technique on the stream's observation records in various embodiments. A random cut forest may comprise a selected number of random cut trees, each of which is constructed for a respective sample of observation records using a recursive random splitting technique with respect to the attribute values of the sample's observation records. Such trees may be termed range random cut trees because they are constructed over a sequence of random cuts, each axis-parallel random cut chosen with probability proportional to its range in that dimension. As discussed below in further detail, the algorithm may be able to generate an outlier score for a given observation record (a quantitative indicator of the extent to which the observation record is anomalous or unusual) without modifying at least some trees of the random cut forest. For example, a probabilistic "fake" insert operation may be performed to identify a potential location within a given tree at which a node representing the given observation record, and the outlier score may be determined based on various characteristics of the potential location (e.g., the depth or distance of the potential location with respect to the root node of the tree, the number of other nodes in the vicinity, and/or the distance of the potential location from other tree nodes as discussed below). Even when a tree is actually updated (which may be done using a probabilistic approach as discussed below), an efficient technique that typically affects only a small subtree may be used, so that the bulk of the tree remains unchanged. In some cases an outlier score may be generated without even traversing the tree to a leaf node or determining the precise insertion location—e.g., because outlier scores may be based at least partly on the depth at which a node is located within a tree, an outlier score may be assigned to a given observation record based on the determination that that record's insertion depth is greater than some threshold. It is noted that in the remainder of this document, the action of inserting a node representing a record into a tree may be referred to simply as "inserting a record" into the tree; similarly, the phrase "deleting a record" from a tree may be used to refer to the action of deleting the node representing the record from the tree.

Each of the trees may represent a dynamically updated sample of the stream's observation records in at least some embodiments. A selected probabilistic stream sample update technique (e.g., a random update technique or a weighted update technique) may be used in various embodiments to decide whether a new observation record (i.e., one for which outlier analysis has not yet been performed) should be included in the sample for a given random cut tree. If a decision is made to update the sample used for a particular random cut tree, a node representing the new observation record may be added to the tree without recreating the entire tree in at least some embodiments. Similarly, a different node representing an eviction target observation record (which is to be replaced in the sample by the node representing the new observation record) may be removed from the tree without reconstructing the entire tree in such embodiments. In some embodiments, a node may be selected for deletion from a tree based at least in part on its "age"—that is, how much time has elapsed since the node was inserted in the tree, or how many observation records have been added since that node was inserted into the tree.

The results of the outlier detection algorithm may be indicated in any of several different formats in different embodiments. For example, in one embodiment an outlier score may be generated for various observation records of the stream, and the client may be provided the scores for all the records for which such scores are computed. The score for a given record may be based on any combination of several factors, as described below in further detail—e.g., on the average tree depth at which the node representing the observation record would have been inserted (or actually is inserted, depending on the results of the probabilistic sample update technique) in various random cut trees of the forest, a sparsity metric associated with the observation record, a distance metric associated with the observation record, etc. In other embodiments, the service may notify the client regarding observation records which meet a threshold reporting criterion. For example, if outlier scores are generated in the range 0.0 to 1.0, with 1.0 representing an extremely unusual or abnormal record and 0.0 representing an inlier or typical record, in one embodiment the service may only notify the client regarding observation records whose outlier score is greater than 0.7 (or some other selected threshold). Records whose outlier scores meet a selected threshold may simply be classified as outliers or anomalies in some embodiments, while the remaining records may be classified as inliers or non-anomalous records. In such embodiments, instead of providing a numerical score whose interpretation is left at least somewhat open, the service may simply provide a binary result for a given observation record: the equivalent of the statement "this record is an outlier" or "this record is an inlier (i.e., not an outlier)" may be provided to the client on whose behalf outlier detection is being performed. The outlier scores (and/or corresponding binary results) generated for different observation records may be stored or recorded, e.g., for later trend analysis. In another embodiment, records may be ranked (or sorted) according to their outlier score.

In one embodiment, a programmatic interface based at least in part on a version of SQL (Structured Query Language) or some other commonly-used query language may be implemented by the SMAS to enable clients to specify the details of the results they wish to obtain—e.g., whether some or all of the attribute values of the observation records should be indicated together with outlier scores, the time windows over which anomaly detection should be performed on received observation records, and so on. Consider an example scenario in which a stream of health sensor records containing heart rate information and exercise metrics (such as the steps taken per minute) of various people is to be analyzed for outliers. A request comprising an SQL-like statement similar to the following may be issued in such a scenario to obtain outlier scores using the random cut forest-based technique:

```
select stream sensorID, heartRate, stepsPerMinute,
    random_cut_forest(sensorID, heartRate, stepsPerMinute)
    as score
    over w1
from healthSensorStream
window w1 as (
    partition by user_id range interval '20' minutes preceding
);
```

In this example request, the requester would be provided outlier scores (together with values of the attributes sensorID, heartrate, and stepsPerMinute for which the random cut trees are constructed) for sensor records generated over a 20 minute time window for each person. It is noted that the exact set of tokens, keywords etc. used for expressing outlier detection requests may differ from those shown above in various embodiments in which SQL-like syntax is supported. In some embodiments, database query languages other than SQL may be employed, or query interfaces that are not necessarily tied to databases may be used.

The definition of what constitutes an outlier in a given set of observation records (whether the records are part of a static set of previously-collected records, or part of an unpredictable stream) may not always be clear-cut. In at least some embodiments, the definition or formula used for determining the outlier score, or for categorizing a given observation record as an outlier or a non-outlier, may be provided to clients, either by default or in response to a programmatic request. As mentioned above, several characteristics of a given observation record may be considered in an anomaly score or a binary anomaly definition, including the scarcity or sparseness of other observation records in the vicinity of the given observation record, as well as the distance (e.g., the Euclidean distance) of the given observation record from other observation records. The statistical distribution of the attribute values of the observation records of a given stream may change over time—for example, a record which was an apparent outlier at a time T1 (based on the observation records analyzed up time T1) may no longer be an outlier, or as much of an outlier at a later time (T1+delta1), based on the records which arrived in the interim period. In some embodiments, the outlier status or score of a given observation record may be re-evaluated at different times with respect to different sets of stored stream records. If the results of the outlier detection algorithm change by a margin which exceeds a threshold, the client may be notified regarding the change in some embodiments.

In at least one embodiment, observation records of the stream, initially examined for outliers in real time (e.g., shortly after the records become accessible at the SMAS), may be re-examined for outliers in batch mode later. For example, the SMAS may be implemented as a subcomponent of a more general machine learning service of a provider network environment. Generally speaking, networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance. In some embodiments, a machine learning service of a provider network may be designed to handle both batch jobs on static collections of observation records, and real-time tasks on streaming data. The records of a given stream may be stored at a repository after they are received. Outlier detection may be performed in real time on the stream using the random cut forest technique outlined above, with respective outlier scores being provided to a client as soon as the scores are generated. At some later point in time, the stream may be closed, or at least a partition or logical subset of the stream may be closed, preventing additional observations from being received. The stored records at the repository may then be re-analyzed using a batch-mode outlier detection algorithm, and the results of the batch-mode operation may be provided to the client. In at least one embodiment, a stream may continue to receive records while batch-mode processing is performed on some subset of the stream's data which has already been collected. In some embodiments the batch-mode algorithm may also use random cut forests, and some of the same trees that were earlier used for the real-time analysis may be updated during the operations of the batch-mode algorithm. In other embodiments a different approach may be used for the batch-mode analysis than was used for the real-time analysis. In at least one embodiment, a machine learning service may support real-time analysis only with respect to streaming data, but may not support batch-mode operations on streams.

In at least one embodiment, raw observation records of a stream may be pre-processed before they are analyzed using the random cut forest technique. Any of a number of pre-processing techniques may be used in different embodiments, including for example normalizing raw values of one or more attributes, generating derived records by aggregating contents of some number of observation records, or applying a transformation function to a value of a particular non-numeric attribute to obtain a derived numeric value. For example, the standard deviation of an attribute may be computed based on historic records, and the value of that attribute in future streaming records may be divided by the standard deviation so as to prevent any one attribute from unduly influencing geometric distance.

In another embodiment, a single numeric attribute may be pre-processed to generate multiple numeric attributes. The shape of the curve of recent values of a numeric attribute may be captured by sliding a window of length w over the past values. This process, known as shingling, transforms one-dimensional data into w-dimensional data. Anomalies in a shingled space represent unusual curves.

Respective values for a number of different parameters of an outlier detection algorithm may have to be selected in various embodiments. Such parameters may include, for example, a size of the baseline set of observation records of the stream which are to be used to generate the initial random cut forest, the number of random cut trees to be included in the forest, the sizes of the samples to be used for the individual trees, and so on. With respect to a formula or equation for outlier score calculation, the tree depth parameters, distance parameters and/or sparsity parameters may have to be selected in at least some embodiments. In some embodiments, some attributes may be assigned different weights than others, indicating for example the relative importance of one attribute versus others when determining whether a given observation record is an outlier, and such attribute weights may be considered parameters of the algorithm. In one embodiment, a time-window or similar temporal replacement parameter may be used to update the trees, e.g., with respect to replacing observation records from the samples, more recently-received observation records may be assigned a higher probability of being included in the samples than older observation records. Other parameters of the outlier detection algorithm may include, for example, a notification threshold to be used to determine whether a notification regarding any given outlier score is to be provided or generated, or an outlier designation threshold indicating the particular border score to be used for binary classification of observation records as outliers or inliers.

In at least some embodiments, one or more of the parameter values may be selected based on entries of a knowledge base of the SMAS or the machine learning service—e.g., parameter values which have worked well in the past for similar data sets may be re-used. For example, a programmatic interface may be provided for a client to provide subjective evaluations of one or more outlier scores or other results produced by the outlier detection algorithm on a given stream in one embodiment. The subjective evaluation information, in raw or processed form, may be stored as a knowledge base entry. Later, that knowledge base entry may be used to adjust or identify parameters to be used for outlier detection for a different stream (or even to modify parameters for newly-arriving records of the data stream for which the evaluation was provided by the client). In one embodiment, some of the parameters may be supplied by a client, e.g., via the SMAS programmatic interfaces. Although clients may not be required to be experts in statistics or machine learning, some clients may be able to provide guidance regarding one or more algorithm parameters (such as temporal replacement parameters for the samples, or weights indicating the relative importance of different attributes) based on their domain-specific expertise regarding the contents of the observation records.

Example System Environment

FIG. 1 illustrates an example system environment in which outlier detection may be performed on streaming data records, according to at least some embodiments. As shown, system 100 includes various resources of a stream management and analysis service (SMAS) 102, organized according to a scalable layered architecture with respective subsystems for receiving, storing, analyzing and providing read access to streaming data. SMAS 102 may comprise an ingestion subsystem 104, a storage subsystem 106, a retrieval subsystem 108, a control-plane subsystem 110 and an analytics subsystem 190 in the depicted embodiment. Each subsystem's resources may be scaled up or down independently of the other subsystems in the depicted embodiment—e.g., if the analytics algorithms being run require additional computational power, more servers may be added to the analytics subsystem 190 without modifying resources at other subsystems. In general, the SMAS may be used by a variety of clients for respective applications in a provider network environment, and not just for anomaly detection. In some embodiments, the SMAS may be used to construct pipelined applications with workflows of arbitrary complexity, in which for example processing results generated from one stream may form the input data records of a second stream, the second stream may be processed to generate input data of a third and fourth stream, and so on. The contents of each such stream may be stored in a persistent fashion, e.g., by replicating raw and/or processed stream records at numerous nodes to provide desired levels of availability and data durability.

Generally speaking, each of the subsystems 104, 106, 108, 110 and 190 may include one or more nodes or components, implemented for example using respective executable threads or processes instantiated at various servers or hosts of a provider network. Nodes of the ingestion subsystem 104 may be configured (e.g., by nodes of the control subsystem 110) to obtain or receive data records of a particular data stream from data producers 158, and each ingestion node 160 may pass received data records on to corresponding nodes of the storage subsystem 106. Data producers 158, such as 158A-158C, may include a wide variety of data sources, such as an array of sensors, logs of web applications, security cameras, and the like in various embodiments. The storage subsystem nodes 161 (e.g., 161A or 161B) may save the data records on any of various types of storage devices (e.g., solid-state drives (SSDs), rotating magnetic disk-based devices, or volatile memory devices) in accordance with a persistence policy selected for the stream. Nodes 162 (e.g., 162A or 162B) of the retrieval subsystem 108 may respond to read requests from external data consumers such as 165A or 165B (which may include, for example, applications to which processed stream data is provided as input) and/or internal data consumers such as analysis node 194A of analytics subsystem 190. The analysis nodes 194 (such as 194A) may be configured to execute or implement a number of different types of statistical or machine learning algorithms in various embodiments, e.g., to provide responses to requests received from SMAS clients 166 regarding specified streams. The control subsystem 110 may include a number of control nodes 168, such as node 168A, collectively responsible for administrative operations such as creating or deleting streams, partitioning streams and the like.

A given stream may be subdivided into partitions (which may also be referred to as shards) in some embodiments. In the depicted embodiment, respective sets of one or more nodes may be designated for each partition of a stream, e.g., at least with respect to the ingestion subsystem, the storage subsystem and the retrieval subsystem. For example, ingestion node 160A may be set up for partition 0 of stream S1, ingestion node 160B may be set up for partition 1 of stream S1, and so on. Similarly, one or more storage subsystem nodes 161 may be set up for each partition, respective sets of retrieval nodes 162A may be set up for each partition as well. In some embodiments, respective subsets of the resources of the analytics subsystem 190 may also be assigned to respective stream partitions.

In the embodiment depicted in FIG. 1, SMAS clients 166 may utilize one or more sets of administrative programmatic interfaces 164 to interact with the control-plane subsystem 110. Similarly, data producers 158 may use producer programmatic interfaces 167 to submit data records, and data consumers may use consumer programmatic interfaces 165 to read the stored records. Some clients 166 may submit data analysis requests for their streams using analytics interfaces 192. A few specific examples of APIs (application programming interfaces) that may be used for submitting stream data records, retrieving stored stream data records, requesting analyses, and/or requesting administrative operations in various embodiments are also shown in FIG. 1. For example, data producers 158 may use a "putRecord" API to submit a data record into a specified stream (or a specified partition of a specified stream). In at least some embodiments, a sequencing indicator (such as a sequence number) may be associated with each data record that is stored by the SMS, and the records of a given stream may be retrievable either in sequence number order or in random order. A "getIterator" API may be used by a data consumer to indicate a starting position or starting sequence number within a stream or partition in the depicted embodiment, and a "getNextRecords" API may be used to retrieve records in sequential order from the iterator's current position. A "getRecord" API may also be supported in the depicted embodiment, e.g., for random accesses that do not require iterators to be established. Control-plane or administrative APIs may include, for example, "createStream" (to establish a new stream), "deleteStream" (to remove an existing stream), and "describeStreams" (to view properties of specified streams).

With respect to stream data analysis, a "getStatistics" API may be invoked, for example, to obtain high-level statistics regarding a specified stream, such as the number of observation records received, the rate of record arrivals, the current total size of the data, the mean or variance of various numerical attributes of the observation records received thus far, etc. A "getOutlierScores" API may be invoked to obtain scores indicative of how anomalous various observation records are, while a "listOutliers" API may be used to obtain observation records which have been classified as outliers (e.g., based on a threshold outlier score determined by the SMAS or by the client). In some embodiments, an interface that is based on SQL or some other familiar query interface may be employed to obtain results of an outlier detection algorithm implemented at the analytics subsystem 190. Other stream-oriented APIs than those shown in FIG. 1 may be employed in different embodiments. It is noted that programmatic interfaces other than APIs (e.g., web pages such as web-based consoles, graphical user interfaces and/or command-line tools) may be used in at least some embodiments.

In various embodiments, an invocation of one of the programmatic analytics interfaces 192 may signal to the SMAS that outlier detection is to be performed on the observation records of a given stream whose observation records are being collected (or going to be collected) from one or more data producers 158. In response, the SMAS may first collect a baseline set of observation records from the specified streaming data sources in the depicted embodiment. The baseline set of observation records may be used to generate an initial collection of random cut trees, with each tree corresponding to a particular sample or subset of the baseline set. The leaf nodes of the trees may correspond to respective observation records, with the non-leaf nodes representing groups of observation records (or "bounding boxes" of attribute values of the observation records represented by the descendant nodes of the non-leaf nodes). The collection of random cut trees may also be referred to as a random cut forest. Details and examples of how the trees may be constructed in various embodiments are provided below.

Figure 6:
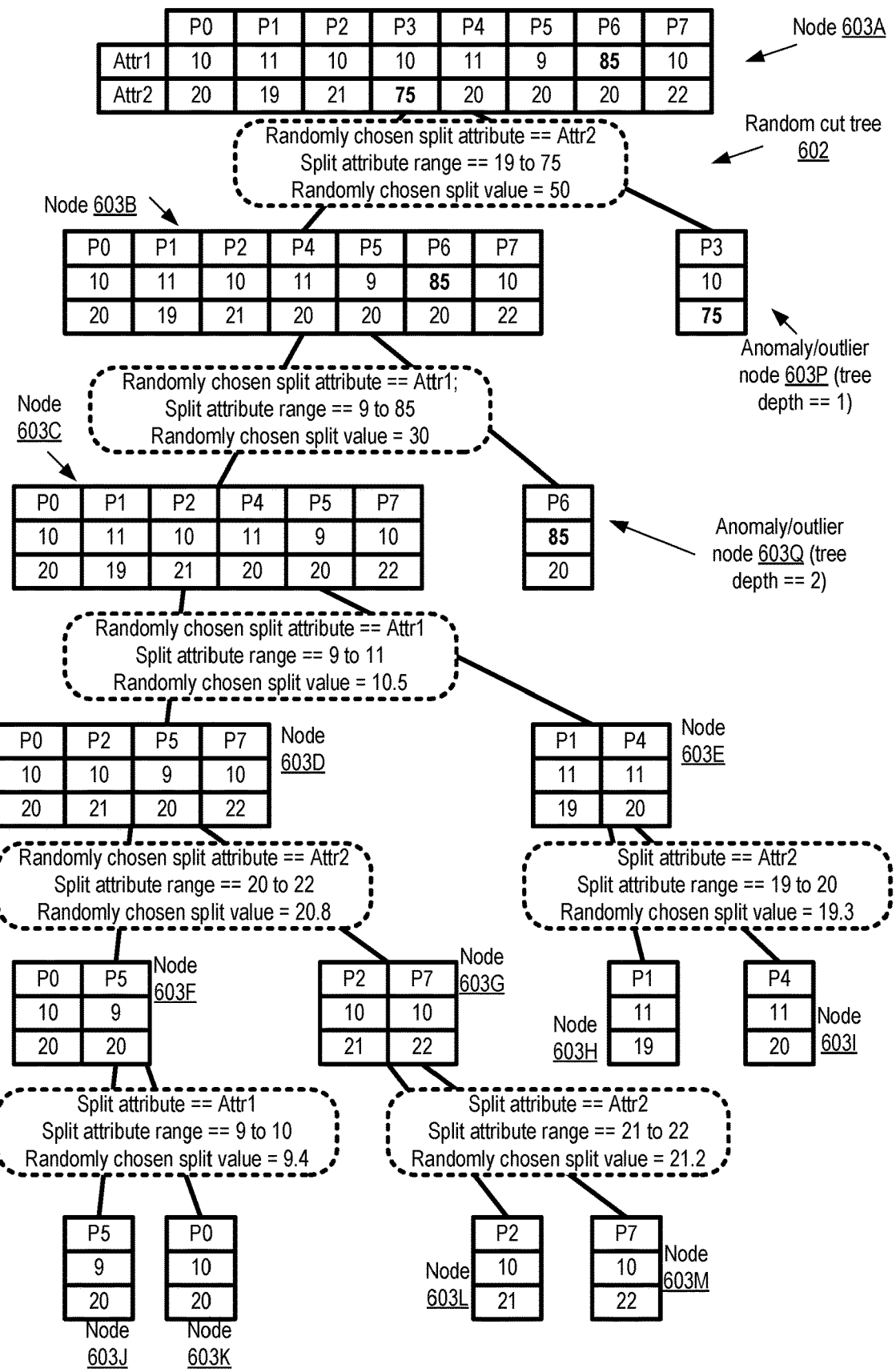
FIG. 6 illustrates an example scenario in which the tree depth at which a node representing an observation record in a random cut tree may be used as an indication of the observation record's outlier status, according to at least some embodiments.

In general, because of the way that the trees are constructed, the location or depth of a given observation record's node in a tree may be indicative of the extent to which the observation record is an outlier. As illustrated in FIG. 6 and discussed below in further detail, in at least some embodiments observation records for which leaf nodes are generated at smaller depths in the tree (i.e., closer to the root of the tree) tend to be more anomalous or unusual with respect to the population of observation records being considered than observation records whose leaf nodes are at greater depths. As a result, outlier scores (e.g., real numbers in the range 0 to 1 or 0 to 100, with higher values representing more anomalous records) may be computed or assigned to observation records based at least in part on the locations of the corresponding nodes in the trees. For example, if ten trees are constructed for respective samples of a given baseline set of observation records, and a given observation record happens to be represented in three of the ten trees, then the depth for that observation record across those three trees and the depth of where the record would be fake inserted across the remaining seven trees may be averaged to generate an outlier score in one embodiment. In other embodiments, the sparsity of the observation record's neighborhood (e.g., if the observation records contain N attributes, how many other observation records are near it in the N-dimensional space corresponding to the attributes) and/or the distance (e.g., the Euclidean distance) of the observation records from other observation records of the samples may be taken into consideration when computing an outlier score.

After the initial random cut forest has been constructed for a given stream using a baseline set of records, the analytics subsystem 190 may begin analyzing new observation records as they arrive. Consider an example scenario in which the forest comprises T trees. When a new observation record OR1 becomes accessible, in some embodiments a "fake" insert of OR1 into each tree may be attempted. During the fake insert (details of which are provided below), the location of the node which would have represented OR1 in the tree had OR1 actually been inserted may be determined, and the fake insert locations of the nodes in the T trees may collectively be used to compute an overall outlier score for OR1. In some embodiments, depending on the preferences of the client 166 on whose behalf the analysis is being performed, the outlier score may be provided to the client as soon as it is computed, e.g., in real time with respect to the receiving of OR1. It is noted that because the initial outlier score can only be computed based on the information available at the time that OR1 is received (and cannot anticipate future observation record contents), the information provided to the client in real time may represent the best available analysis only as of a given point on time. As discussed below, in some scenarios the outlier status or score for a given observation record may actually change if its recomputed at later points in time, e.g., based on time-varying trends in the distribution of attribute values of the stream's observation records.

In at least some embodiments, the samples used for the trees, and hence the trees themselves, may be updated probabilistically as new observation records arrive. In some embodiments, a random sample update algorithm may be used, in which uniformly distributed random numbers may be used to determine whether a given new observation record is to replace a previously-included observation record with a given sample S. In other embodiments, a weighted random sample update algorithm may be used, in which for example more recent observations are in general more likely to be included in a sample (and hence represented in the random forest) than older observation records, although the decision to include a given observation record may still be made probabilistically. If a decision to insert an observation record OR1 into a tree is made, a node representing OR1 may be inserted at the position previously identified in the "fake" insertion operation, and a selected node may be removed to keep the sample size for the tree unchanged. In some embodiments, the probabilistic stream sample update algorithm may be used to make the decision as to whether to insert a new observation record prior to (instead of after) obtaining the outlier score for the new observation record—e.g., a "fake" insert may only be performed if the decision that the observation record is not to be inserted has been made earlier. In one embodiment, a time window or observation record count window may be used, in which at a given point in time PT1, only those observation records received within a specified time interval (PT1–delta1, PT1) are analyzed to identify outliers, or only the N most recently-received observation records are analyzed to identify outliers.

High-Level Overview of Outlier Detection Algorithm

Figure 2:
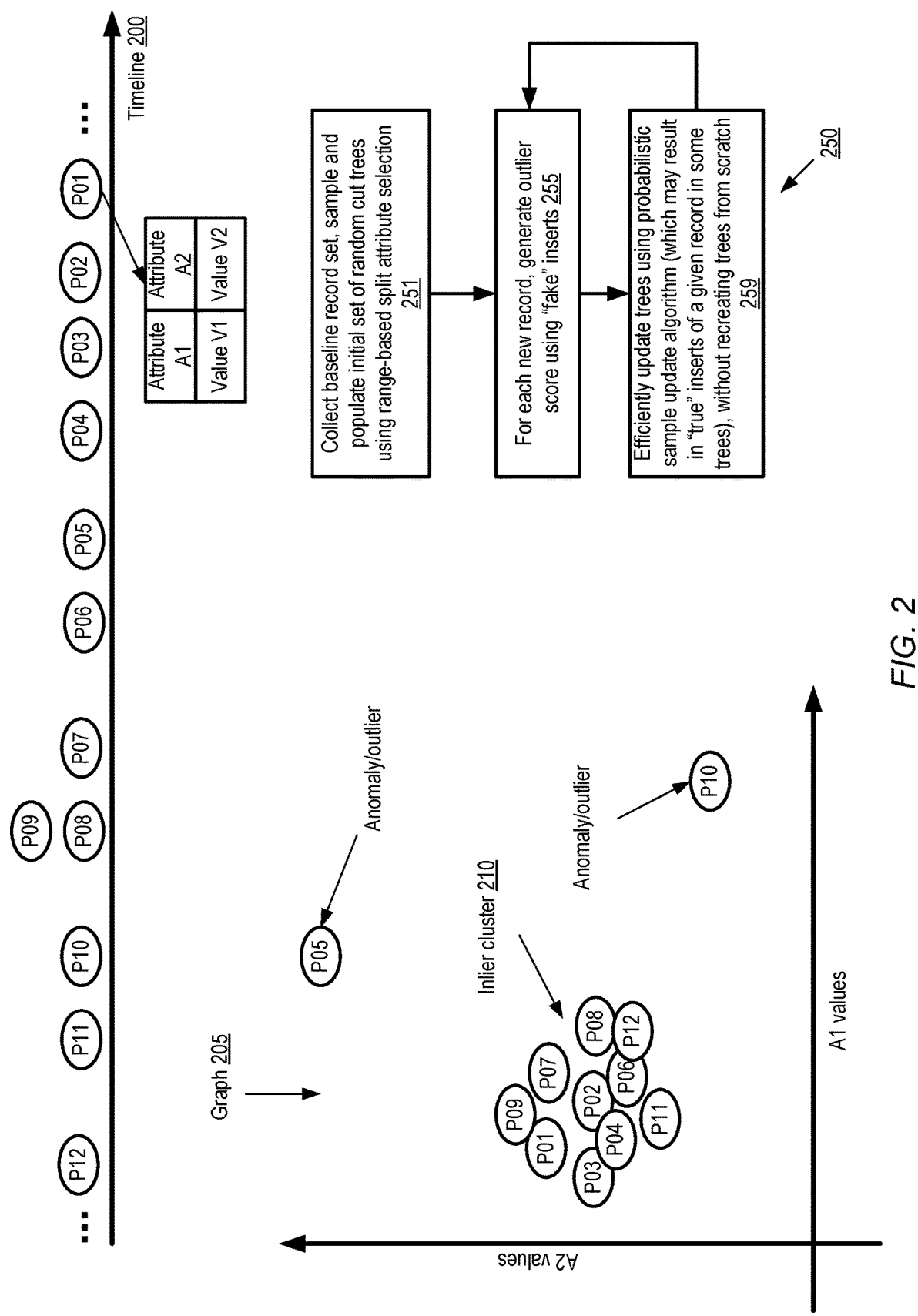
FIG. 2 provides a trivial example of a stream of two-attribute observation records with a pair of outliers, and a high-level overview of an outlier detection algorithm, according to at least some embodiments.

FIG. 2 provides a trivial example of a stream of two-attribute observation records with a pair of outliers, and a high-level overview of an outlier detection algorithm, according to at least some embodiments. Timeline 200 indicates the relative arrival times of 12 observation records or points P01 to P12 of the stream, each of which comprises values of two numerical attributes A1 and A2. As shown, the inter-arrival times for the stream's observation records may vary, and some observation records (such as P08 and P09) may arrive simultaneously or near-simultaneously. It is noted that a very small stream of records is shown to avoid clutter and to illustrate the concepts associated with outlier detection.

Graph 205 shows a plot of the A1 and A2 values of the twelve points P01-P12. A1 values increase from left to right along the horizontal axis, and A2 values increase from the bottom to the top along the vertical axis. Intuitively, all the observation records with the exception of P05 and P10 appear to be fairly close to each other in their attribute values (and are accordingly collectively labeled inlier cluster 210), while P05 and P10 appear to be outliers or anomalies. The goal of the outlier detection algorithm whose high-level overview is indicated in flow chart 250 is to identify, as soon as possible after the arrival of a given observation record such as any of P01-P12, whether that observation record should be classified as a member of the inlier cluster 210, or assigned a score which would indicate that it is an outlier.

As indicated in element 251, in the initial stage of the algorithm, a baseline set of observation records may be collected from the stream (note that the number of observation records shown with respect to timeline 200 in FIG. 2 is too small to provide a useful baseline set). From that baseline set, some number of smaller samples may be selected, and respective random cut trees may be constructed for each sample, e.g., using range-based split attribute selection as described below instead of completely random selection of split attributes. After this initial phase is completed, in the depicted embodiment, an outlier score may be generated for each newly received observation record, based on respective "fake" inserts into each of the trees (element 255). In a "fake" insert, the tree may be traversed starting from the root until the potential insertion location for a node representing the observation record is found, without actually modifying the tree. An outlier score for the observation record may be determined with respect to each tree (or some selected number of trees) based on the position or depth of the potential insertion location, and then all the outlier scores for the different trees may be aggregated (e.g., by obtaining a mean score) to arrive at the overall or final outlier score for the point. This final score may optionally be reported to one or more destinations and/or stored in persistent storage, depending on the reporting and/or score persistence preferences of the client on whose behalf the stream is being analyzed. As shown in element 259, zero or more of the trees may be probabilistically updated by actually inserting a given observation record (and deleting a node to keep the sample size unchanged). These types of insertions, called "true" insertions herein, may typically be performed less frequently than the "fake" insertions used for outlier score calculations in at least some embodiments. The insertion of a new node into a given tree may involve rearranging subsets of the tree's nodes, as described below in further detail, without recreating the tree from scratch, and may therefore be more efficient than if each insertion required reconstructing the entire tree. Operations corresponding to elements 255 and 259 may be repeated for new observation records, e.g., until the stream is terminated in the depicted embodiment. Over time, the trees would change as more of its nodes are replaced, and the contents of the trees (and hence the outlier scores derived from the trees) would tend to represent the more recent observation records more closely than the observation records which arrived in the more distant past.

Time-Varying Outlier Status

Figure 3:
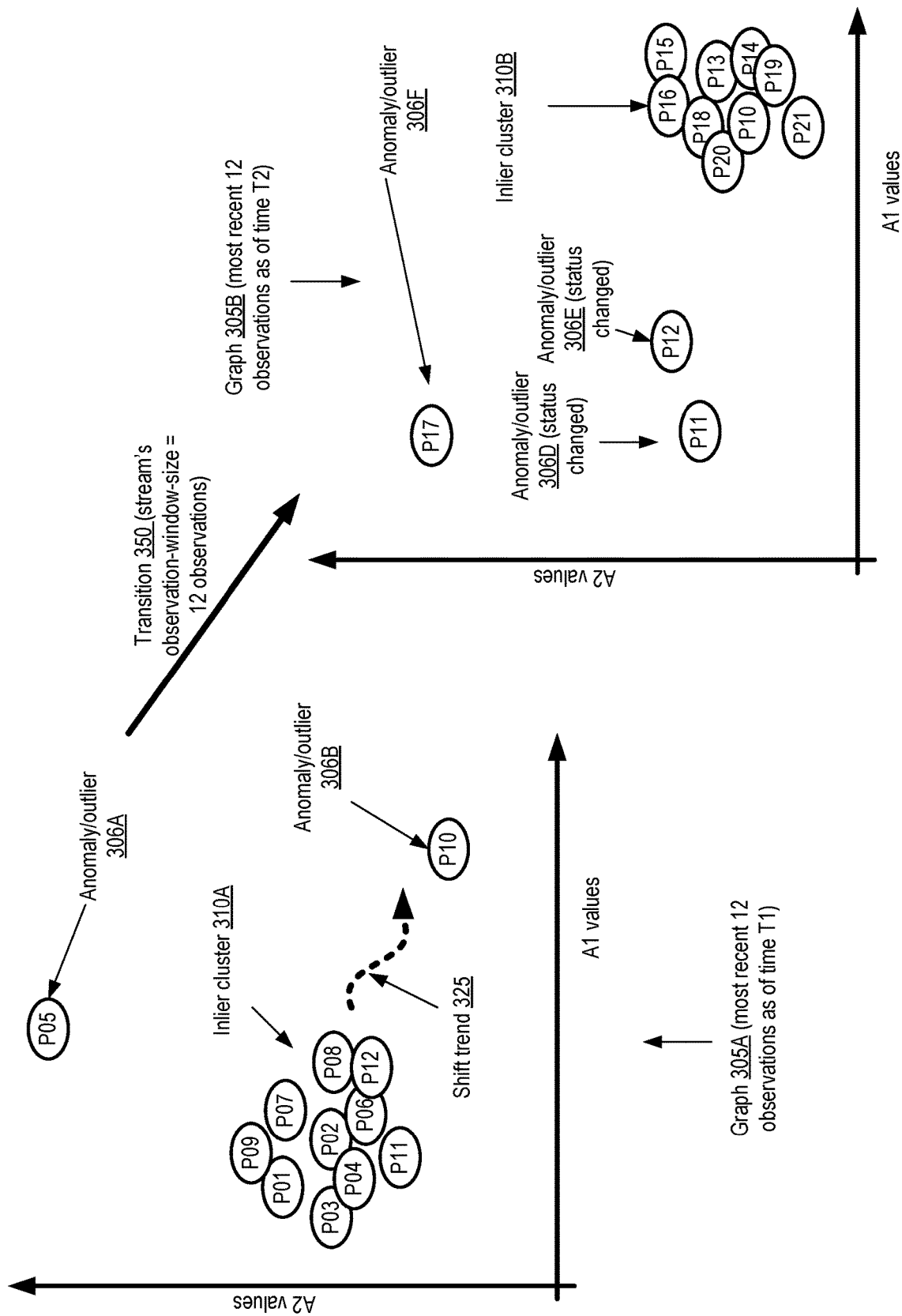
FIG. 3 illustrates an example of a shift in the distribution of streaming observation record attribute values over time, which may result in changing the outlier status of some observation records, according to at least some embodiments.

FIG. 3 illustrates an example of a shift in the distribution of streaming observation record attribute values over time, which may result in changing the outlier status of some observation records, according to at least some embodiments. As in FIG. 2, a streaming data set whose observation records contain values of two attributes A1 and A2 is examined for anomalies. Graph 305A shows the distribution of the twelve most recent observation records of the stream as of time T1, while graph 305B shows the distribution of the twelve most recent observation records as of some later time T2. In Graph 305A, observation records P05 and P10 may be considered anomalies or outliers 306A and 306B, and observation records P10, P02, P03, P04, P06, P07, P08, P09, P11 and P12 may be considered members of an inlier cluster 310A.

As indicated by arrow 325, there is a shift trend in the location of the observation records in the two-dimensional space corresponding to A1 and A2 values after T1 in the depicted embodiment. After ten more observation records have been received after T1, the distribution of the twelve most recent observation records has changed to that shown in graph 305B. Now, P10 is no longer an anomaly; instead, P10 is part of a current inlier cluster comprising P10, P13, P14, P15, P16, P18, P19, P20, and P21. P17 appears to be a new outlier 306F. Furthermore, with respect to the current group of 12 observation records, P11 and P12 also appear to be outliers, as indicated by their labels 306D and 306E. Thus, the outlier status of P11 and P12 has changed between times T1 and T2. In addition, the status of P10 has also changed, from being an outlier at time T1, to an inlier at time T2.

In some embodiments, as mentioned above, the outlier scores of various observation records are provided to clients or other destinations in real time or near-real-time—that is, as soon as, or very shortly after, the scores are initially computed (e.g., using the random cut tree-based technique discussed above). Thus, for example, it may be the case in the scenario illustrated in FIG. 3 that an outlier score for P11 may be transmitted or displayed to a client at a time (T1+delta1), where delta1 is small compared to (T2−T1). At time (T1+delta1) the score for P11 may be relatively low, so P11 may be considered an inlier. In the example shown in FIG. 3, if an outlier score were re-calculated for P11 at a time shortly after T2, the score may be much higher than at (T1+delta1), indicating P11's new status as an outlier. In some implementations, the outlier score or status for a given observation record may be reported only once by the entity analyzing the stream. In other implementations, the outlier score for a given observation record may be recomputed and/or reported several times, e.g., once in real-time and at least once later. In some embodiments, the observation records of a stream may be analyzed for outliers in real time as they arrive, and saved in a repository for later re-analysis which may be performed in batch mode. For some applications, such repetitive or iterative outlier detection techniques may be extremely helpful, as it may be important to capture gradual trends in the behavior of the sources of the observations.

Overview and Example of Random Cut Tree Construction

As indicated above, the outlier detection algorithm employed in various embodiments may utilize a variant of random cut trees in which the attributes on which splits are performed may be selected based on the ranges or spans of the attribute values, and in which the outlier score for a given record may be based on several factors including neighborhood sparsity and distance from other points. The terms "split" and "random cut" may be used interchangeably herein to refer to the division of a set of data records into smaller subsets based on a selected boundary value along one of the attributes or dimensions of the observation records. Prior to describing the contributing factors to outlier status and the range-based variant for split attribute selection, it may be helpful to cover some basic concepts regarding random cut trees and their use in outlier analysis.

Figure 4:
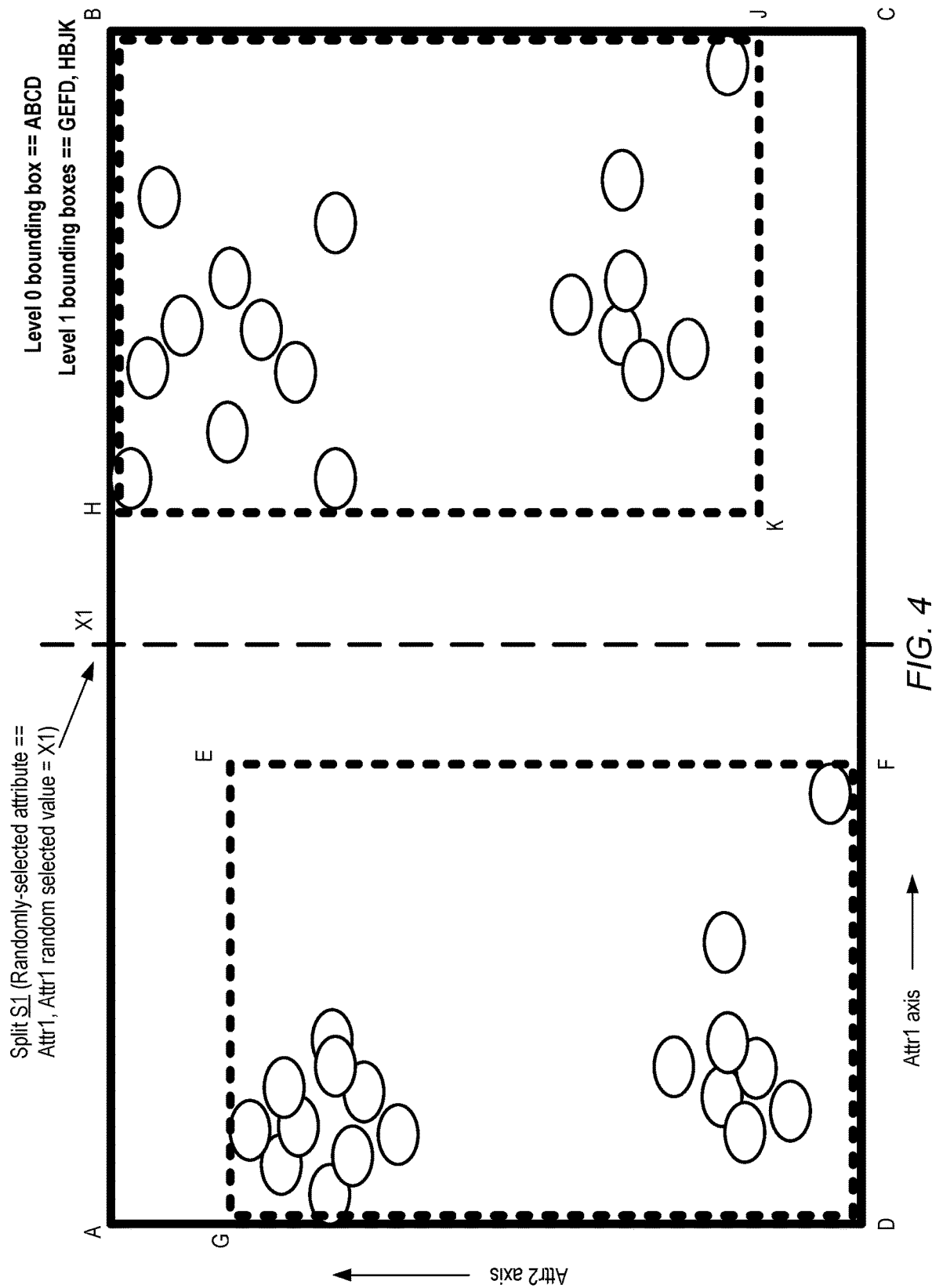
FIG. 4 and FIG. 5 collectively illustrate initial steps of a technique for identifying outliers from a data set using random cut trees, according to at least some embodiments.
Figure 5:
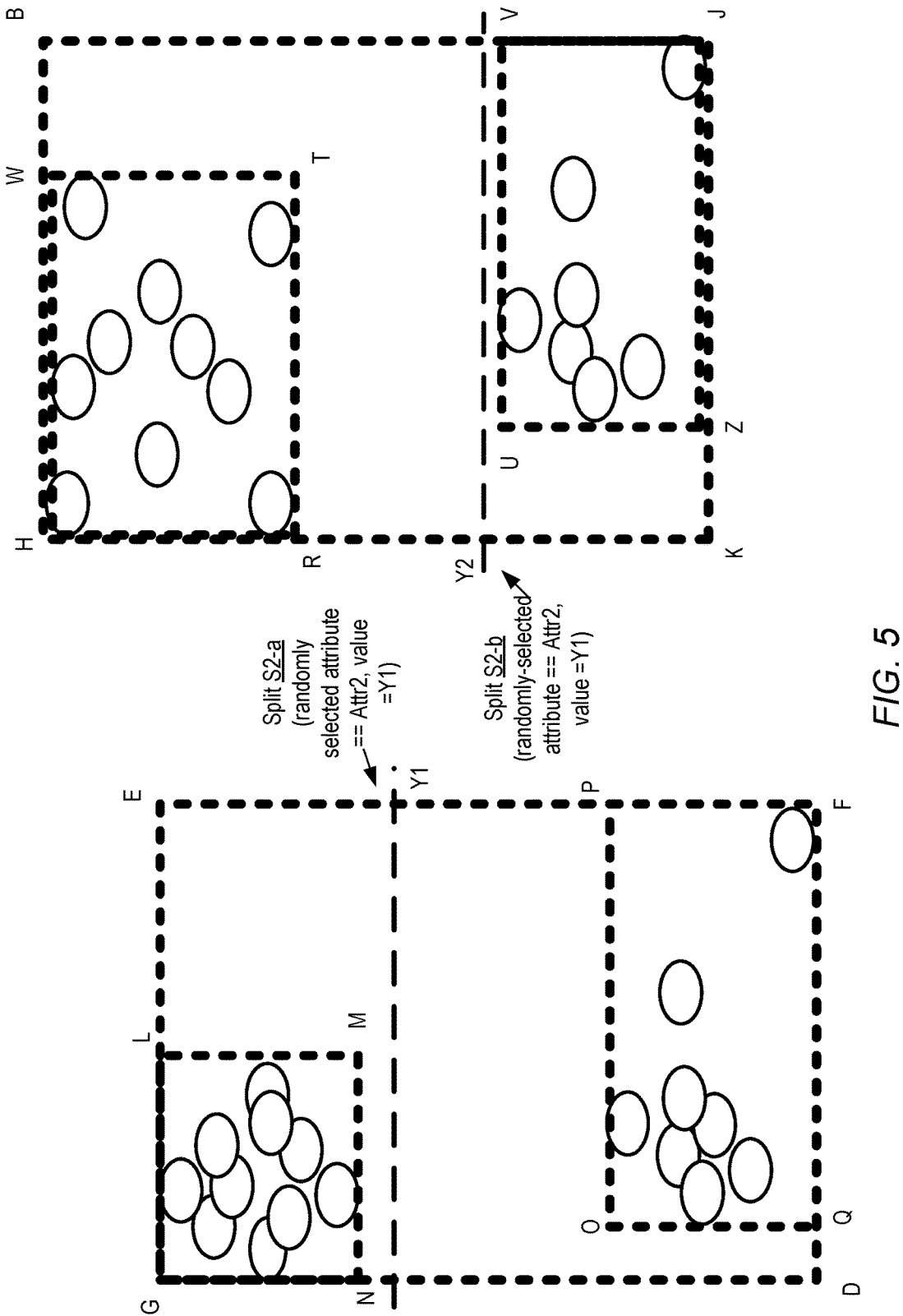

FIG. 4 and FIG. 5 collectively illustrate initial steps of a technique for identifying outliers from a data set using random cut trees, according to at least some embodiments. A two-dimensional data set comprising 35 records is used in the example scenario illustrated, and the data set is assumed to remain unchanged during the time period corresponding to the initial steps. Each record contains values for two numeric attributes Attr1 and Attr2, and the distribution of the records is plotted with Attr1 values increasing from left to right on the horizontal axis and Attr2 values increasing from the bottom to the top on the vertical axis. A "bounding box" ABCD in the two-dimensional space of Attr1 and Attr2 values contains all 35 points. For a given set of two-attribute records such as those shown in FIG. 4, the bounding box corresponds to the area formed by multiplying (Attr1max−Attr1min) by (Attr2max−Attr2 min), where Attr1max is the largest value of Attr1 among the records, Attr1min is the smallest value of Attr1 among the records, Attr2max is the largest value of Attr2 among the records, and Attr2 min is the smallest value of Attr2 among the records. (Attr1max−Attr1min) may be referred to as the "range" or "span" of Attr1, and (Attr2max−Attr2 min) may be referred to as the "range" or "span" of Attr2. The concept of bounding boxes (which may be extended to any desired number of dimensions) may be used extensively herein when discussing operations associated with random cut trees.

In a first step of constructing a random cut tree for the records, a particular attribute may be selected (e.g., at random from among all the attributes, or based on the attribute's value range as discussed below) as the attribute on which the records are to be split. In FIG. 4's split S1, attribute Attr1 is selected as the first split attribute, and a value of X1 for Attr1 (chosen, for example, at random within the range of Attr1) is used to subdivide the records into two smaller subsets. The first subset corresponds to bounding box GEFD, and the second subset corresponds to bounding box HBJK. The bounding box ABCD containing all the records being analyzed may be referred to as a "Level 0" bounding box, and may be represented by a root node in a corresponding random cut tree. The child bounding boxes GEFD and HBJK may be referred to as "Level 1" bounding boxes and may each be represented by a respective child node of the root of the random cut tree. (An example construction of a complete tree corresponding to a collection of eight records is shown in FIG. 6 and discussed below.)

After the Level 1 bounding boxes have been identified, the process of random splitting may be recursively applied to the Level 1 bounding boxes to produce Level 2 bounding boxes, as shown in FIG. 5. With respect to Level 1 bounding box GEFD, a random split S2-a may be performed on the Attr2 axis, with the split value Y1 in the depicted example. As a result, Level 2 bounding boxes GLMN and OPFQ may be produced, and corresponding nodes may be added to the random cut tree. Similarly, a random split S2-b may be performed on bounding box HBJK, in which Attr2 also happens to be chosen as the split attribute, but a different split value Y2 is selected. As result, Level 2 bounding boxes HWTR and UVJZ may be generated, and corresponding nodes at a tree depth of 2 (i.e., two hops from the root node) may be created. The process of recursively splitting each bounding box may be repeated in various embodiments until bounding boxes which contain only single records (and hence cannot be split further) are produced. In some embodiments, trees may only be constructed to a selected depth— e.g., to a depth proportional to the logarithm of the sample size, or a fixed constant. In such a scenario, leaf nodes at the selected depth may represent bounding boxes rather than individual records. Such pruning of trees may be performed under the assumption that with respect to nodes which would have been inserted in positions beyond the selected depth, the corresponding data records would not represent outliers, so there is no need to extend the trees beyond the selected depth. After the tree is constructed, the respective depths of the leaf nodes representing the various observation records may be computed and used to compute outlier scores for the observation records in some embodiments. As shown in FIG. 6, although the process of constructing the random cut trees is probabilistic, in general anomalous points would tend to correspond to leaf nodes higher up in the tree (closer to the root).

FIG. 6 illustrates an example scenario in which the tree depth at which a node representing an observation record in a random cut tree may be used as an indication of the observation record's outlier status, according to at least some embodiments. A random cut tree 602 for a collection of eight observation records P01-P07 is shown. Each observation contains respective values for two numeric attributes Attr1 and Attr2. With the small number of records included in the example, it is relatively easy to determine (even without constructing the tree) that with respect to Attr1, most records cluster in the value range 9-11, with P6 being an outlier with an Attr1 value of 85, and that with respect to Attr2, most records cluster in the value range 19-22, with P3 being an outlier with an Attr2 value of 75.

The root node of tree 602 corresponds to the bounding box representing all 8 records. Attr2 is chosen as the first split attribute with probability proportional to its range (75−19)/((75−19)+(85−9)). Attr2's range in the root's bounding box is 19 to 75, and a split value of 50 is chosen from within that range. As a result, at tree depth 1, two nodes are created: node 603B with 7 observations whose Attr2 values are less than 50, and node 603P with one observation (P3). The process of splitting the non-leaf nodes (i.e., nodes which represent more than one observation record) is continued with respect to node 603B and its child nodes. Attr1 happens to be the attribute selected for the second split, and the value 30 is chosen for the second split, resulting in the creation of non-leaf node 603Q representing P6. Attr1 is chosen again as the split attribute at level 3, and the split value of 10.5 is selected from the Attr1 range 9 to 11, resulting in non-leaf nodes 603D and 603E. Eventually, a leaf node is created for each observation record. The depths (number of hops required to reach the leaf node from the root) of the leaf nodes corresponding to the observation records is as follows: P0, P2, P5 and P7 are each located at depth 5, P1 and P4 are at depth 4, P6 is at depth 2 and P3 is at depth 1. Thus, tree 602 provides one example where the nodes corresponding to outliers (P3 and P6) end up at smaller depths (closer to the root) than the nodes representing observations which are inliers. Of course, if the split attributes are chosen at random, and the split values are also chosen at random from within the corresponding attributes' value ranges, it may sometimes be the case that some outliers happen to be placed at greater depths than some inliers. However, if a sufficiently large number of random cut trees is constructed, in general the average tree depth of a node (with respect to all the trees in which it is represented) may tend to be negatively correlated with the outlier status of the corresponding observation record—that is, the smaller the average depth, the more likely it may be that the observation is an outlier.

Efficiently Updated Random Cut Forests for Streaming Data

Figure 7:
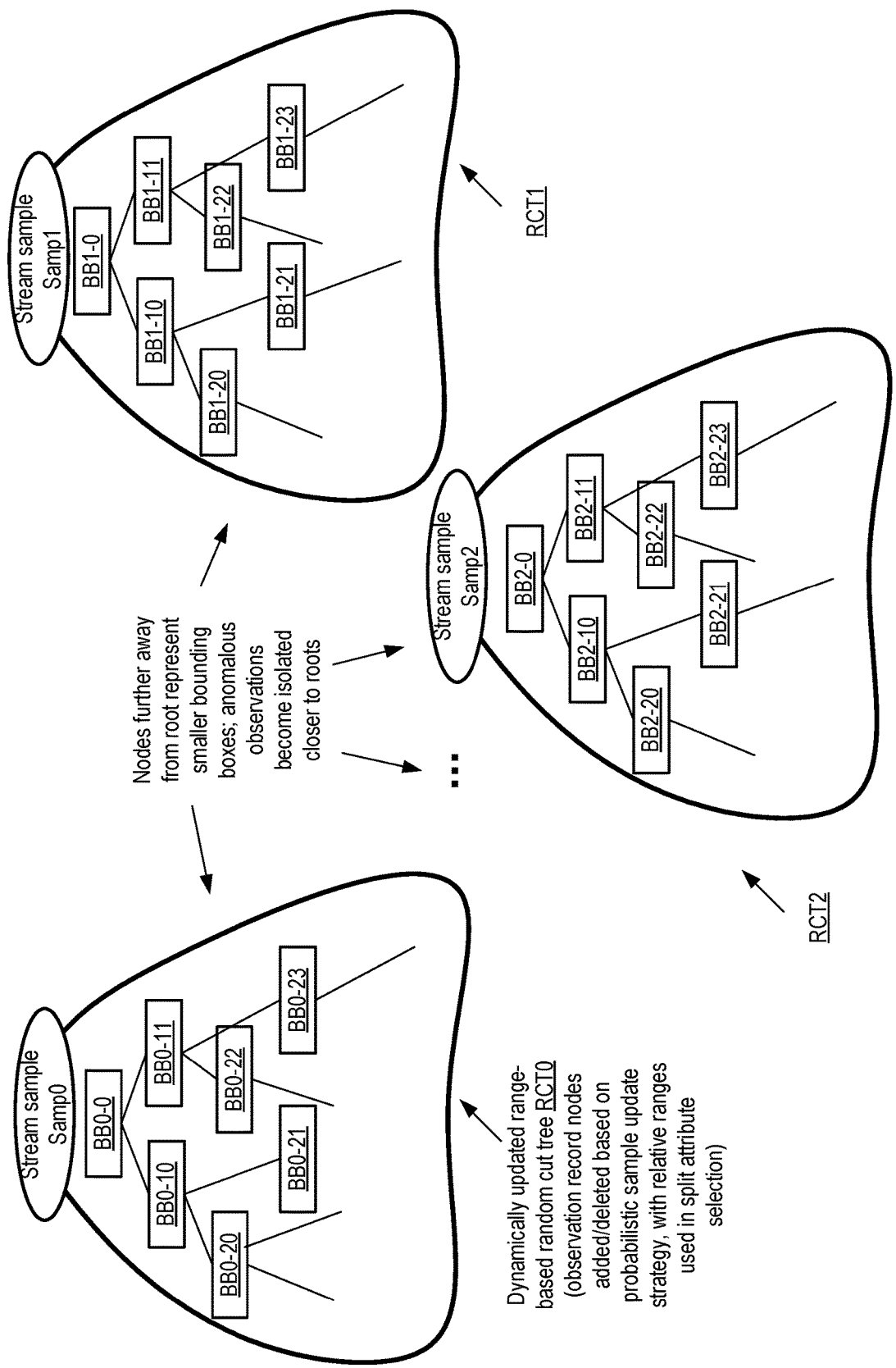
FIG. 7 illustrates an example set of random cut trees which may be created and updated probabilistically for a streaming data set, according to at least some embodiments.

As indicated above, in at least some embodiments multiple random cut trees may be constructed, e.g., from respective samples or subsets of a data set, and the outlier scores for a given data record may be obtained using more than one tree (e.g., from all the trees in which that observation record happens to be represented). FIG. 7 illustrates an example set of random cut trees which may be created and updated probabilistically for a streaming data set, according to at least some embodiments. In the depicted embodiment, a baseline set of observation records may be collected, e.g., after a request to perform outlier detection on the stream is received. From that baseline set, respective samples such as Samp0, Samp1 and Samp2 may be obtained, e.g., using reservoir sampling. Any given observation of the baseline set may not necessarily be represented in any given sample; in some scenarios, it may be the case that some observation record may not be represented in any of the samples.

With respect to each sample, a corresponding variant of a random cut tree may be constructed. As discussed below in the context of FIG. 9, during the construction of these variant trees, when selecting an attribute as the next split attribute, the relative range or span of the different (potentially already normalized) attributes in the bounding box being split may be taken into account, so that attributes with a larger range of values may tend to be selected preferentially as split attributes. Such trees may be referred to as range-based random cut trees herein. RCT0, RCT1 and RCT2 may be generated corresponding to Samp0, Samp1 and Samp2 respectively using range-based split attribute selection. Each sample may represent a corresponding root bounding box—e.g., bounding box BB0-0 may correspond to the observation records of Samp0, BB1-0 to the observation records of Samp1, and so on. Using the range-based splitting approach, and the root node as the first parent node to be split, nodes representing smaller bounding boxes may be generated recursively until respective leaf nodes are created for all the observation records of the sample in some embodiments. In other embodiments, the tree generation may be terminated at some selected depth, e.g., under the assumption that nodes added at greater depths are unlikely to be outliers and so can be counted among the tree's nodes, but need not be remembered. The random cut trees such as RCT0, RCT1 and RCT2 generated for a given stream (or for a static data set) may collectively be referred to as a random cut forest. In some cases, transformation functions may be applied to observation records (e.g., to normalize the values of individual attributes) before the trees are generated.

After the initial versions of the RCTs have been generated from the baseline set, they may be used to assign outlier scores for new observation records that are not members of the baseline set. When a new observation record is received, at least two kinds of operations may be performed with respect to each tree. In one set of operations, which may be referred to as a "fake" insert, the location of the node which would have represented the new observation record in a given RCT, if the new observation record were to be added to that RCT's sample, may be determined using an insertion algorithm described in greater detail below. Such potential insertion locations may be identified for each tree of the forest, without actually modifying any of the trees in some embodiments. The potential insertion locations for the different trees may be used collectively to generate an outlier score for the new observation record. In general, anomalous observation records would tend to be isolated (i.e., be represented by leaf nodes) closer, on average, to the roots of the RCTs in the depicted embodiment. In some embodiments, the outlier score may be provided to the client or clients on whose behalf the outlier detection is being performed and/or stored in a persistent repository.

In a second set of operations with respect to the new observation record (which may be performed prior to at least some if the fake inserts, after at least some of the fake inserts, or in parallel with at least some of the fake inserts) and a given RCT, a probabilistic stream sample update algorithm may be used to determine whether the new observation record should in fact be inserted into the sample being used for that RCT or not. For example, if 10 RCTs have been created for the stream, 10 independent decisions may be made as to whether or not a given observation record should be inserted (in a "true" insert operation, as opposed to a fake insert) into a sample, with one decision being made for each tree. In some embodiments, a uniform random distribution-based stream sample update algorithm may be used, in which the probability that any new observation record displaces a previously included observation record within a sample is the size of the sample k divided by the total number of records collected thus far. This approach, known as reservoir sampling, ensures that all record subsets of size k have an equal chance of being selected. In other embodiments, a weighted stream sample update algorithm may be used, in which for example newer observation records are assigned a higher weight or priority with respect to inclusion in the sample than older observation records. If and when a decision is made to insert an observation record into a sample corresponding to one of the RCTs, in at least some embodiments a corresponding previously-inserted observation node may be selected and removed from the sample, so that the sample size does not change over time. The node representing the inserted observation record may be placed at the insertion location identified for the fake insert (in those cases in which the fake insert is performed prior to the insertion decision). In other embodiments sample sizes may change over time. An efficient probabilistic technique which may be used to insert nodes for new observation records into RCTs without having to reconstruct the trees fully is described below in further detail. In at least some embodiments the operations performed on a given RCT (e.g., fake inserts, tree-specific outlier score calculations, true inserts and/or deletions) may be performed in parallel with operations on other RCTs.

Factors Contributing to Outlier Status

Figure 8:
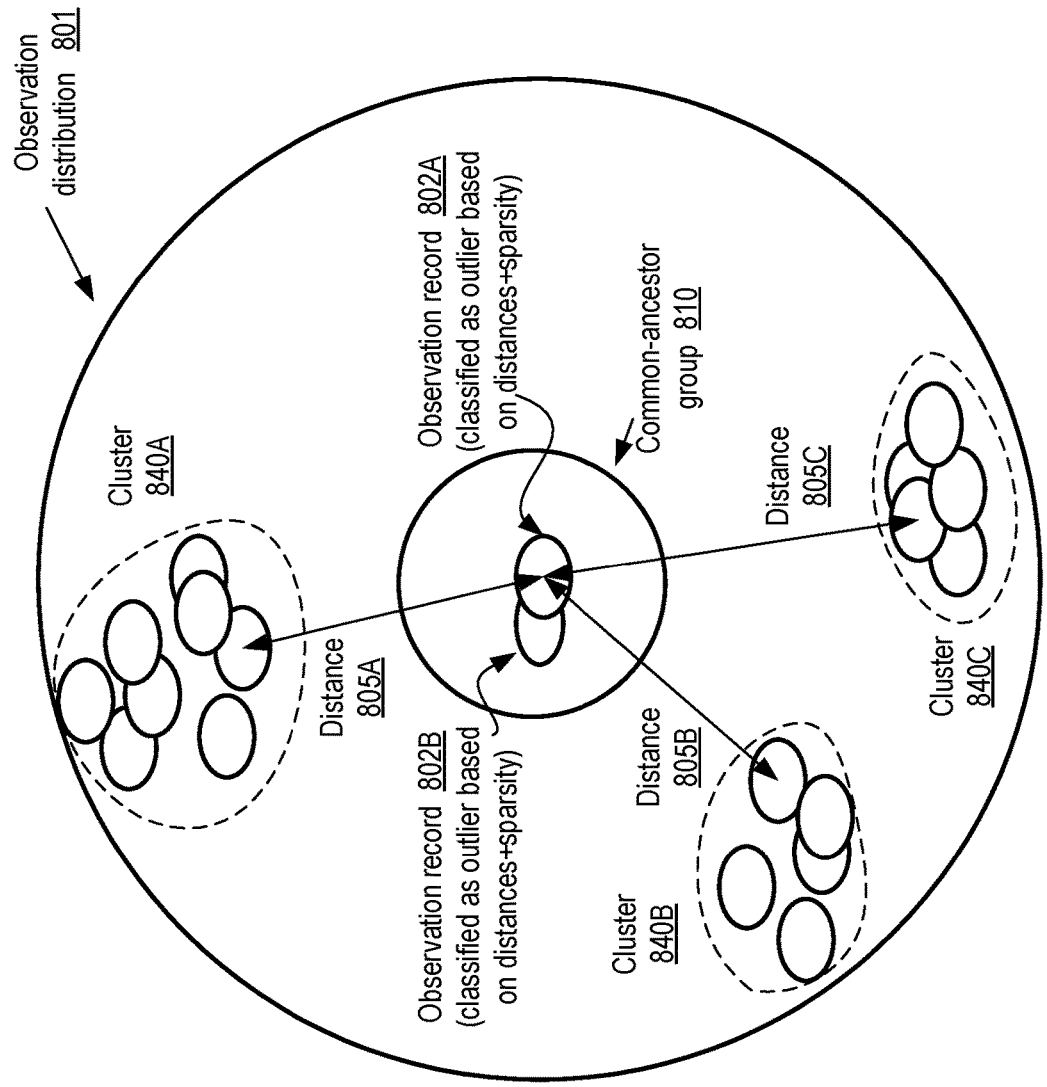
FIG. 8 illustrates the use of distance and sparsity metrics for identifying outliers in a streaming data set, according to at least some embodiments.

In different embodiments, the precise thresholds and statistical properties that are used to designate an observation record as an outlier, or to generate an outlier score for a given observation record, may vary. FIG. 8 illustrates the use of distance and sparsity metrics for identifying outliers in a streaming data set, according to at least some embodiments. In the depicted example scenario, clusters 840A, 840B and 840C, each respectively comprising several "similar" (with respect to other records of their clusters) observation records within a two-dimensional observation distribution space 801 are shown, as well as two observation records 802A and 802B which do not belong to the clusters.

A geometric definition of an outlier may be used in the depicted embodiment, which captures the spirit of a small number of records that lie in a large empty space, i.e., a set of records S0 of small cardinality whose closest neighbor outside of S0 is at least distance L away. According to such a definition, a subset S0 of S records may be considered a (j, L)-outlier if (a) the cardinality (number of records) of S0 is less than or equal to j, and (b) the minimum distance between any of the points in S0 and any of the records in (S−S0) exceeds L. (The notation (S−S0) indicates those records of S which are not in S0.) The first of these conditions may be referred to as a sparsity criterion, while the second may be referred to as a distance criterion.

In the scenario depicted in FIG. 8, the nodes 802A and 802B may constitute such a small-cardinality group S0. The nodes representing 802A and 802B in an RCT constructed for the observation records shown in FIG. 8 may both be child nodes of the same parent node PN1, for example, and may therefore be considered members of a neighbor group or a common-ancestor group 810. If the parameter j in the outlier definition is set to 2, and if the minimum distance of the nodes representing 802A and 802B from any of the records of clusters 840A, 840B or 840C exceeds some selected L value (e.g., if the Euclidean distances 805A, 805B and 805C all exceed L), 802A and 802B may be designated as (2, L) outliers according to the definition. In different embodiments and for different streams, respective values may be selected for the sparsity parameter j and the distance parameter L, e.g., based on some initial statistics collected for the stream and/or based on knowledge base entries. As part of the fake insert operation associated with a given observation record, distance and sparsity metrics may be computed for the node representing the observation record, and an outlier score may be calculated based on both metrics in some embodiments.

In one embodiment, a node displacement metric (not shown in FIG. 8) may be used to compute an outlier score. At a high level, a node displacement metric may be intended to capture the aggregate amount of change to the pre-existing nodes' positions which would result from an insertion of a new node for which the outlier score is to be calculated. For example, a node which would be inserted near the top of the tree would typically lead to a displacement (e.g., by one additional hop or edge away from the root) of a larger subset of pre-existing nodes, while nodes which would be inserted closer to the bottom levels of the tree would typically lead to a displacement of a smaller subset of pre-existing nodes. As discussed earlier, the nodes which tend to be added nearer the root are more likely to be unusual or anomalous. As a result, the aggregate displacement of other nodes (the sum of the total additional number of hops or edges between each node and the root) resulting from a fake insert may be used to obtain an outlier score for the node for which the fake insert is being performed. Other displacement-related metrics such as the average displacement change among all the pre-existing nodes resulting from a fake insert may be used in some implementations. In various embodiments, any combination of one or more of the following factors/metrics may be used for computing outlier scores: the depth of the potential insertion location for a new observation record, the distances of the potential insertion node from other nodes, the sparsity of the neighborhood of the potential insertion node, and/or a displacement metric associated with the potential insertion node.

Range-Based Splits

Figure 9:
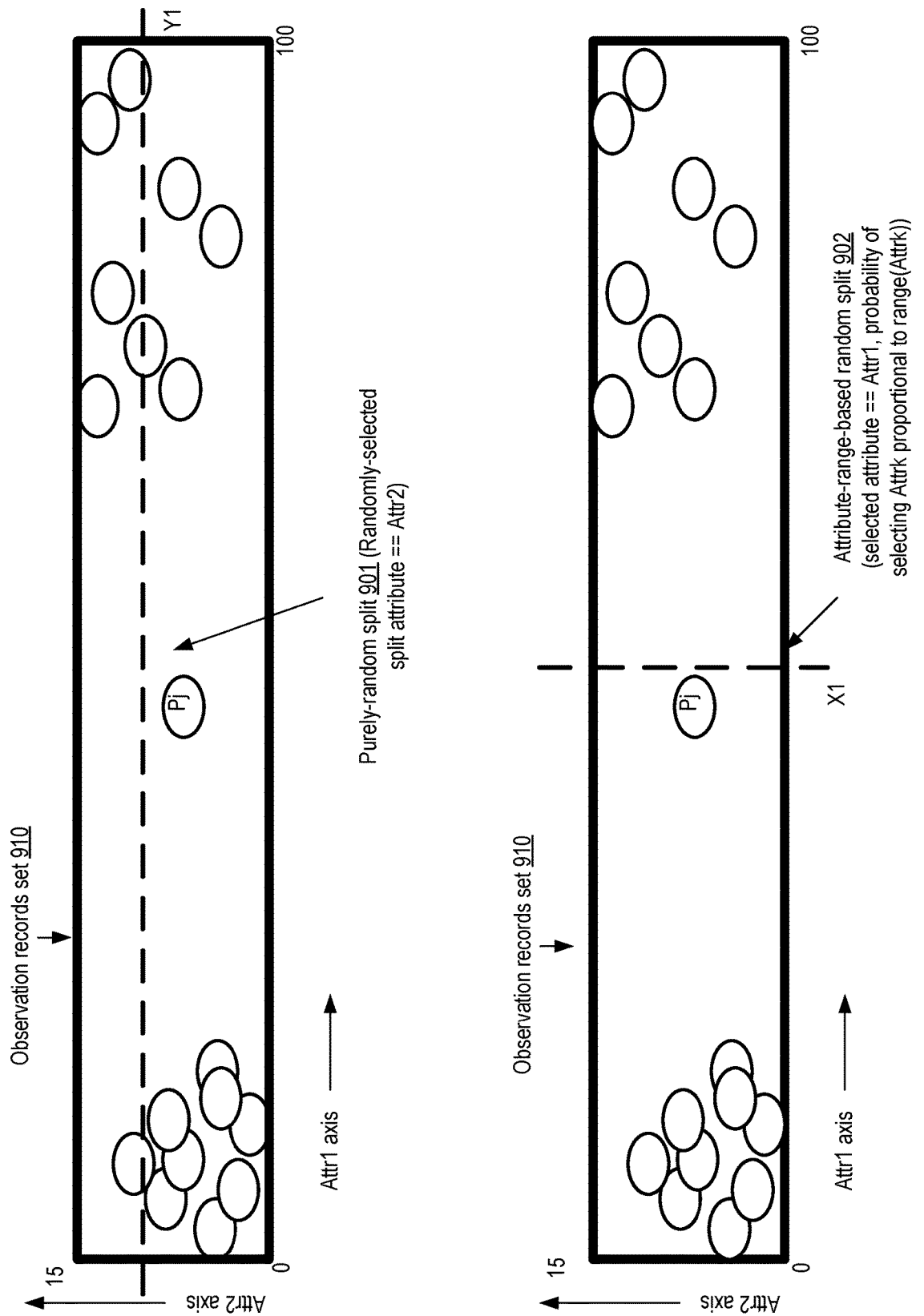
FIG. 9 illustrates a range-based splitting technique which may be employed in an outlier detection algorithm for streaming data, according to at least some embodiments.

As discussed earlier, a number of splits or random cuts may be performed during the construction or modification of a random cut tree. If the attribute along which the observation records are to be split at any given point in the algorithm is chosen completely at random from among all the attributes, this may result in some sub-optimal splits (i.e., splits which do not correspond to substantial progress towards isolating outliers). Instead, in at least some embodiments, a more data-driven split attribute selection technique may be used, in which the relative ranges of the attributes are taken into consideration while still retaining an element of randomness in the split attribute selection decision. FIG. 9 illustrates a range-based splitting technique which may be employed in an outlier detection algorithm for streaming data, according to at least some embodiments.

In the depicted embodiment, two alternatives for splitting a given set of two-attribute observation records 910 are shown. Each observation record contains values for respective attributes Attr1 and Attr2. Attr1 values increase from left to right along the horizontal axis, and Attr2 values increase from bottom to top. The minimum Attr1 value among the records is 0, and the maximum is 100; in contrast, Attr2 values range from 0 to 15. The records form two clusters with respect to Attr1 (with one outlier Pj), but are fairly uniformly distributed in the Attr2 dimension.

If Attr2 is chosen as the split attribute, as indicated in split 901 (with a split value of Y1) in FIG. 9, this may not be as helpful in isolating the outlier Pj as a split along Attr1 may be. In fact, if Attr2 continued to be selected as a split attribute several times due to purely random split attribute selection, it may take many more splits to generate a leaf node corresponding to Pj. In contrast, if the probability of choosing Attr1 as a split attribute were increased, the time taken (and the number of tree levels generated) to create a leaf node representing Pj may be shortened. One way to introduce this type of intelligent bias into the selection of split attributes is to consider the range (maximum minus minimum value) of each attribute, and to assign a higher probability of selection to those attributes which have a higher range. Such a range-based attribute selection technique may be employed in various embodiments, e.g., to generate the initial set of random cut trees from the baseline set of observation records of a stream, during the fake insert operations and/or during true insert operations. In the example shown in FIG. 9, since Attr1 has a range of 0 to 100, and Attr2 has a range of 0 to 15, the sum of the ranges is (100−0)+(15−0) or 115. If the probability that Attr1 is chosen is made proportional to its range (relative to the total range of all the attributes), and a random number between 0 and 115 is chosen to identify the selected attribute, Attr1 may be selected with the probability (100/115) as the split attribute, resulting for example in split S2 with split value X1. In at least one embodiment, a single random choice may result in the selection of the split attribute as well as the split value. For example, if the random number 45 is selected from the range 0-115, this may indicate that a split value of (Attr1=45) is to be used, while if the random number 107 is selected, this may indicate that a split value of (Attr2=(107−100)=7) is to be used. Similarly, at each stage of the algorithm at which a split or random cut is to be performed, the relative ranges of each of the attributes (within the set of records to be split) may be taken into account in at least some embodiments.

Of course, it may sometimes be the case that within the raw observation records of a given stream, some attributes may have much smaller ranges than others, based on the semantics of the data being collected. For example, one attribute may represent the number of years of formal education of an individual, while another attribute may represent the annual income of the individual. The number of years of formal education may typically have a much smaller range (say, between 0 and 20 or so), while the income may vary much more widely (e.g., depending on the currency, between 0 and 10,000,000 or so). In such scenarios, the raw observation records may be pre-processed before the outlier analysis is performed—e.g., the values of the attributes may be normalized by dividing each value by the standard deviation of some number of the observed raw values in one implementation.

Inserting and Deleting Nodes

As indicated earlier, a probabilistic algorithm may be used for updating the samples used for the random cut trees in various embodiments. A random update policy may be selected in some embodiments, in which the probability of any given observation record being retained in a sample is equal to that of any other observation record which arrives after the sample was initially constructed. In other embodiments, a time-weighted sample update algorithm may be used, in which the probability that a given observation record is retained decreases over time—that is, newer observation are in general more likely to be incorporated into the sample. Other weighted sample updated policies (e.g., in which records are assigned insertion probabilities based on client-assigned weights rather than temporal weights) may be used in some embodiments. Once the decision to insert a given observation record into a particular sample is made (which may also be accompanied by a deletion of a selected observation record to keep the sample size unchanged), in various embodiments a node insertion technique that does not require rebuilding the sample's random cut tree from scratch may be employed. Instead, some sub-trees may be moved during such an insert, and the bounding boxes of some number of non-leaf nodes may be modified. In at least one embodiment, this efficient update algorithm may be used for identifying the potential insertion locations during fake insert operations, and also during true inserts. A fake insert may differ from a true insert in that the modifications to the tree are not saved (e.g., made persistent) in the case of the fake insert, and are saved in the case of the true insert. If the probabilistic sample update algorithm results in a decision not to update a tree for a given observation record, the changes to the tree that were made during the fake insert may be discarded in various embodiments; if the algorithm resulted in a decision to update the tree, the changes corresponding to the fake insert would be made permanent.

The efficient insert algorithm used in some embodiments may be described as follows. To insert a record or point p, we start at the root of the random cut tree and compute a bounding box including p. If p falls inside the old bounding box then the bounding box is unchanged. And, the same random split decision (i.e., attribute selection and split value selection) is made with respect to p's insertion as was made without p. If the bounding box changes with the addition of p then a new random split decision is made (e.g., using range-based split attribute selection and random split value selection as discussed before). This new split may be performed with respect to a different attribute than the attribute on which the split at the same node was performed earlier—e.g., if, at a given node N1 with a bounding box BB1, a split was performed on values of attribute Attr1 earlier, and the new node p falls outside BB1, another random split computation may be performed (e.g., taking the ranges of the various attributes into account), and a different split attribute Attr2 may be selected. If the newly computed split falls inside the old bounding box, then the newly computed split is ignored and p is moved down the original tree (towards the child node that coincides with the split containing p). If the new split value falls outside of the old bounding box then we make p one child, and the other child becomes the current node (the node being split). The bounding boxes are then adjusted up to the root. The steps of the insert algorithm summarized above may be described more formally as follows.

Insert Algorithm Steps

1. We have a set of observation records S' and a corresponding random cut tree T. Each observation record has d dimensions or attributes. A new observation record p is to be inserted to produce a modified tree T'.
2. If S' is empty we return a single-node tree containing p as the root.
3. Otherwise, S' has a bounding box $B(S')=[x_1^l, x_1^h] \times [x_2^l, x_2^h] \times \ldots [x_d^l, x_d^h]$, where the l and h superscripts indicate the low and high values for the corresponding attribute.
4. For all dimensions i, let $y_i^l=\min\{x_i^l, p_i\}$ and $y_i^h=\max\{x_i^h, p_i\}$
5. Choose a random number r between 0 and $\Sigma_i(y_i^h - y_i^l)$
6. This value r corresponds to a range-based split decision.
7. If the r-based split separates S' and p, then we use it as the first split of the modified tree T'. A new non-leaf node is added to the tree T'; one child of the non-leaf node is a node representing p, and the other child is the node that was split using r.
8. If the r-based split does not separate S' and p, then we discard the r-based split and traverse the tree downwards, following the pre-existing cut at S'. This selected child node represents a different bounding box B(S''). The procedure is repeated for B(S'').
9. The bounding box of T' is adjusted as needed in either case (i.e., whether the r-based split separates S' and p, or not).

Figure 10:
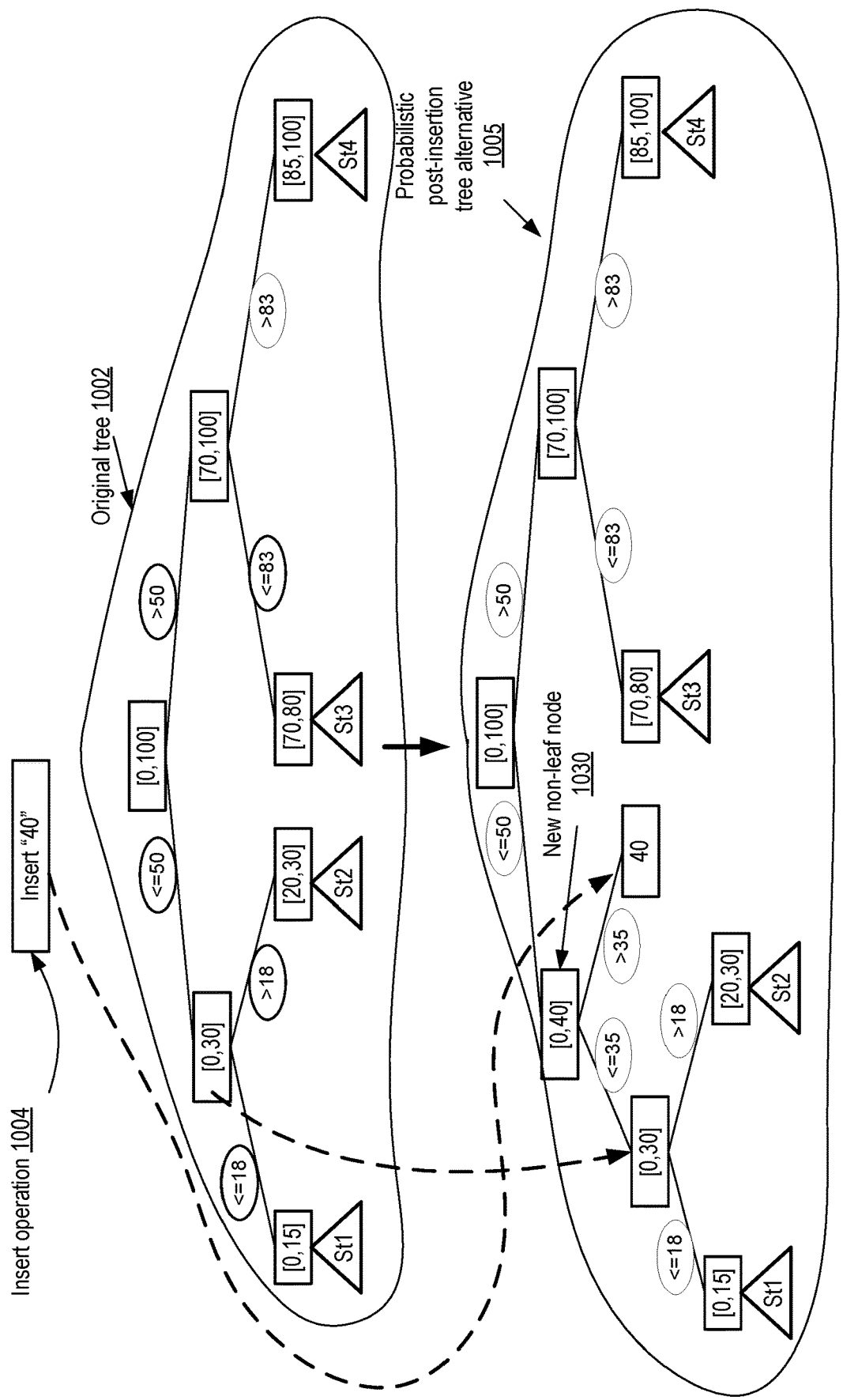
FIG. 10 illustrates an example of a random cut tree which may potentially be produced as a result of an insertion of a new observation record into a sample used for the tree, according to at least some embodiments.

FIG. 10 illustrates an example of a random cut tree which may potentially be produced as a result of an insertion of a new observation record into a sample used for the tree, according to at least some embodiments. Random cut trees corresponding to a data set whose observation records each contain a single integer attribute are constructed in the depicted scenario. In FIG. 10, one possible result of an insert operation 1004 corresponding to a record with the attribute value 40 into original tree 1002 is shown. Only a subset of the nodes of the tree is shown, with triangles representing lower-level sub-trees St1, St2, St3 and St4. The respective attribute range corresponding to the bounding box for each tree node is shown (e.g., [0, 100] for the root node), and the split value are indicated in the labels used for edges leading to child nodes. For example, the split attribute value of 50 is used at the root node, so one edge from the root is labeled "<=50" and the other is labeled ">50".

The insert algorithm starts at the root of tree 1002, which has a one-dimensional bounding box [0, 100]. Since the to-be-inserted record has a value of 40, which falls within the root bounding box, a random split made with respect to the root node may result in no change at the root. One of the root's child nodes is selected for traversal. In FIG. 10, the node [0, 30] is selected because it corresponds to the split value range (<=50) within which the to-be-inserted value of 40 falls. Because the maximum value (30) represented by the node [0, 30] is lower than the to-be-inserted node's value of 40, a random split is performed in the range [0, 40]. This random split (at 35 in the depicted example, as indicated by the edge labels "<=35" and ">35") happens to be in the range [30, 40]—that is, it separates the subtree rooted at [0, 30] and the new node [40]. As a result, a new non-leaf node 1030 replaces the original [0, 30] node in the alternative result tree 1005. One child of this new non-leaf node 1030A is a leaf node representing [40], while the other child of this new node is the original node [0, 30], which is transferred one level down together with its descendant nodes. The bounding box values of new non-leaf node 1030 are set to [0, 40] to indicate that its descendants span the range between 0 and 40.

As indicated in the example of FIG. 10, the insertion algorithm does not require reconstructing the entire tree. Instead, a subset of the nodes may be moved as a group (e.g., to a lower level in the tree), a new leaf node may be added to the original tree, and a new non-leaf node may be added in each insertion. Such an insertion approach may be much less expensive than re-creating the entire tree, especially because most new nodes (assuming most nodes are not outliers) would only result in modifications at greater depths in the tree.

Figure 11:
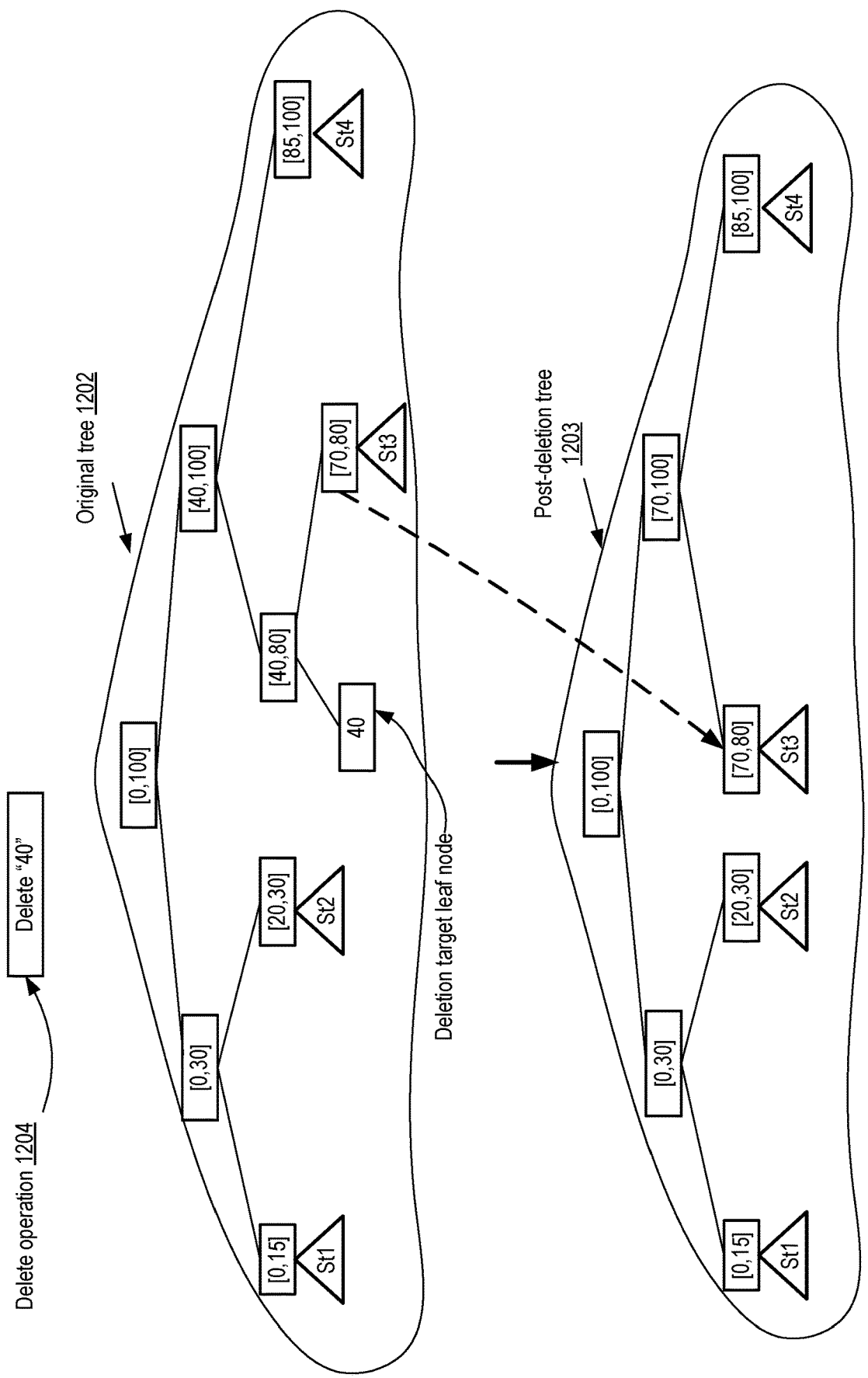
FIG. 11 illustrates an example of changes to an random cut tree resulting from a deletion of an observation record from the sample used for the tree, according to at least some embodiments.

As mentioned earlier, in at least some embodiments the sample sizes corresponding to the range-based random cut trees may be kept constant as the trees are updated, which means that each insertion may be accompanied by a corresponding deletion. The deletion may be performed either before or after the insertion in different embodiments. FIG. 11 illustrates an example of changes to a random cut tree resulting from a deletion of an observation record from the sample used for the tree, according to at least some embodiments. The algorithm for deletion may be summarized as follows. Given a tree T and a record p to be deleted, the leaf node LN corresponding to p is found. Then, that leaf node LN is deleted, and the sibling node of LN is moved up one level in the tree, replacing the node which was originally LN's parent node. The bounding boxes of the nodes on the path towards the root may be adjusted.

In original tree 1202, the leaf node corresponding to the target node of deletion operation 1204 has a parent node [40, 80] and a sibling node [70, 80]. In accordance with the deletion algorithm, the leaf node [40] is deleted, and the sibling node is moved up one level. Then, the path between the new position of the sibling node and the root is traversed, and the corresponding bounding boxes are updated. For example, the node with bounding box [40, 100] in the original tree is updated to [70, 100] in the modified post-deletion tree 1203. In the embodiments illustrated in FIG. 10 and FIG. 11, neither insertions nor deletions require reconstructing trees; instead, each insert or delete operation may typically affect only a small number of nodes.

Machine Learning Service

Figure 12:
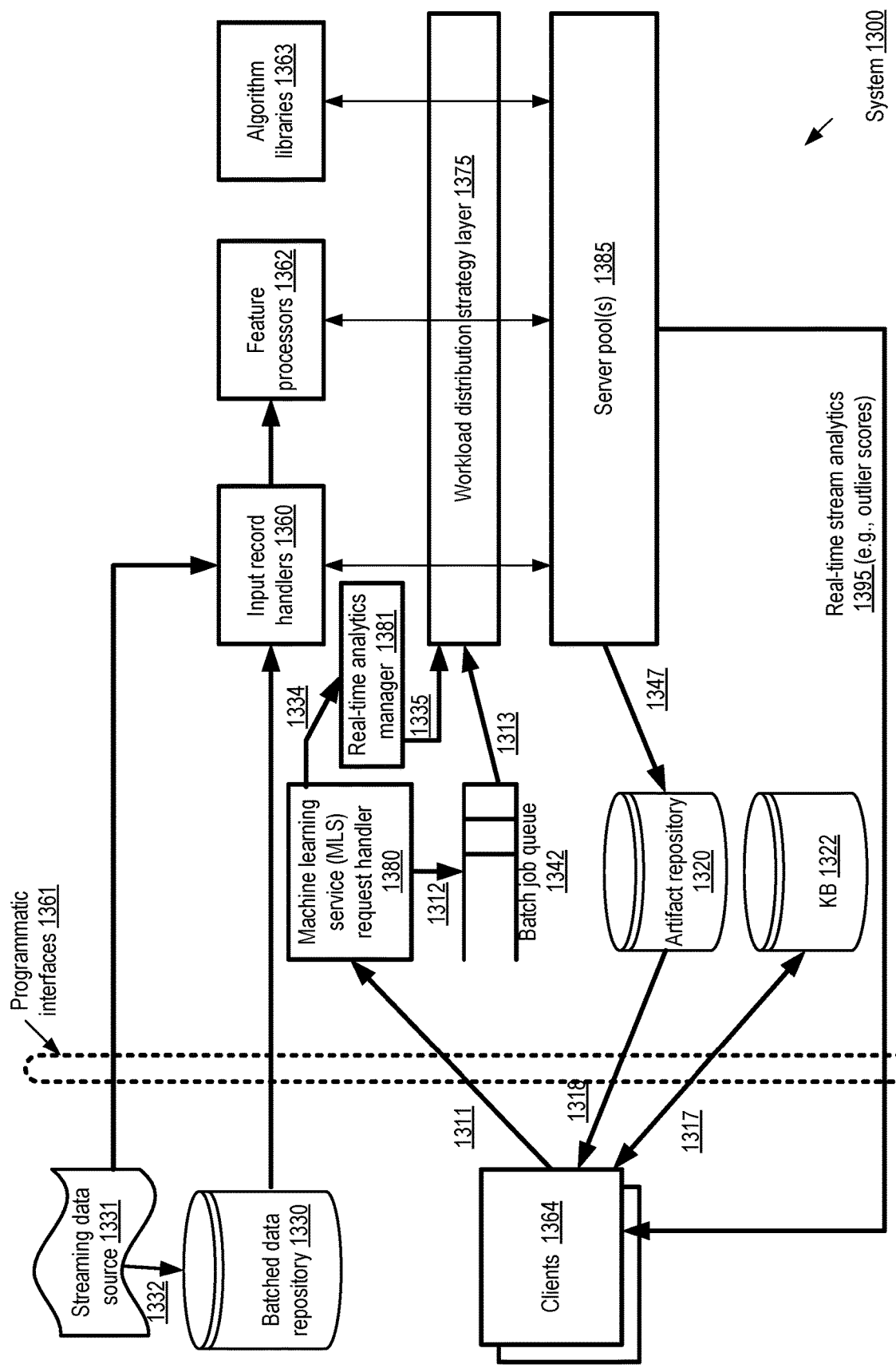
FIG. 12 illustrates a machine learning service at which analysis of streaming data as well as static data sets may be conducted, according to at least some embodiments.

In some embodiments, the outlier detection algorithm for streaming data described above may be implemented at a machine learning service of a provider network as mentioned earlier. FIG. 12 illustrates a machine learning service at which analysis of streaming data as well as static data sets may be conducted, according to at least some embodiments. System 1300 includes various components of a scalable machine learning service, including a real-time analytics manager 1381 which may utilize servers from server pools 1385 for computations of the outlier detection algorithm discussed above. The machine learning service may be implemented at a provider network in some embodiments, and the resources used for the machine learning service may be distributed among a number of different data centers.

In the depicted embodiment, input data for various types of analysis may be obtained from at least two types of sources: batched data repositories 1330 and streaming data sources 1331. In addition to the real-time analytics manager 1381, the machine learning service (MLS) may comprise a request handler 1380, a knowledge base 1322 and an artifacts repository 1320 in the depicted embodiment. The knowledge base 1322 may represent a growing collection of entries representing insights gained during earlier instances of the use of outlier detection algorithms (as well as other algorithms) for a variety of data sets, and may be used to guide some of the decisions made by the real-time analytics manager 1381, such as the selection of algorithm parameters for outlier detection. As mentioned earlier, a number of parameter values may have to be selected for a given outlier detection request, such as the number of random cut trees to be generated, the sizes of the corresponding samples, the sample update parameters, and so on. The artifacts repository 1320 may be used to store interim and/or final results of outlier detection operations, values of the parameters selected, and so on.

A set of one or more programmatic interfaces 1361 may be implemented at the machine learning service for interactions with clients 1364 in the depicted embodiment. The interfaces may include, for example, one or more web-based consoles or web pages, application programming interfaces (APIs), command-line tools, graphical user interfaces (GUIs) or the like. Using interfaces 1361, clients 1364 may, for example, submit a request to perform outlier detection on the records of a stream whose records can be obtained from a specified streaming data source 1331. The data source may be identified, for example, by providing access information such as a network address, a database address, and/or a storage device address. In some implementations an SQL-based programmatic interface may be included in programmatic interfaces 1361, enabling clients to submit outlier detection requests (and view results corresponding to such requests) using familiar and easy-to-use interfaces.

Generally speaking, the data records of a stream may comprise numerous attributes, including numeric attributes and non-numeric attributes such as categorical attributes, text attributes, Boolean attributes and the like. In some embodiments, outlier detection may be restricted to streams which comprise only numeric attributes—that is, the MLS may reject a request to perform outlier detection if the stream's records contain non-numeric attributes. In other embodiments, the raw data records of a given stream may be pre-processed (e.g., at input record handlers 1360 and/or at feature processors 1362) before the outlier detection algorithm is applied, and such pre-processing may include generating numeric attributes derived from at least some non-numeric attributes using binning or other similar approaches. In such embodiments, outlier detection may be performed on the pre-processed data set rather than on the raw data records of the stream. Other types of pre-processing may also be implemented in various embodiments, such as normalizing attribute values, aggregating groups or subsequences of the data records into combined records, and so on.

In their programmatic interactions with the MLS via interfaces 1361, clients 1364 may indicate a number of preferences or requirements which may be taken into account when performing outlier detection in various embodiments. For example, clients may indicate preferred values of one or more parameters of the outlier detection algorithm (such as the number of random cut trees to construct, the sizes of samples, etc.), and/or the thresholds to be used at the MLS to determine the results to be reported. One client 1364 may wish to view outlier scores (e.g., together with attribute values) for all data records for which scores are generated, while another may only wish to be informed regarding records with outlier scores above a system-defined or client-specified threshold. Clients may also assign weights to records (e.g., temporal replacement parameters to be used to determine whether and how older records should be substituted by newer records in the samples used for the trees) or to individual attributes. Attribute-specific weights, which may indicate the subjective importance of different attributes from a client perspective, may be used to select split attributes (e.g., in addition to or instead of range-based selection) in some embodiments. Some clients 1364 may simply indicate a source of the streaming data and leave the analysis and reporting decisions to the MLS; other clients, who are more conversant with the statistics involved or who are experts in the subject matter or domain for which the stream records are collected, may provide more detailed guidance or preferences with regard to the outlier detection decisions.

The administrative or control plane portion of the MLS may include a request handler 1380, which accepts client requests 1311, determines whether the client request pertains to real-time analysis or batch mode analysis, and takes different actions depending on the nature of the analysis requested. Real-time requests such as outlier detection requests for streaming data may be passed to real-time analytics manager 1381. For batch-mode operations, the request handler may insert corresponding job objects into batch job queue 1342, as indicated by arrow 1312. In general, the control plane of the MLS may comprise a plurality of components (including the request handler, the real-time analytics manager, workload distribution strategy selectors, one or more job schedulers, metrics collectors, and modules that act as interfaces with other services), which may also be referred to collectively as the MLS manager. The data plane of the MLS may include, for example, at least a subset of the servers of pool(s) 1385, storage devices that are used to store input data, intermediate results or final results (some of which may be part of the MLS artifact repository), and the network pathways used for transferring client input data and results.

A given batch job object may indicate one or more operations that are to be performed as a result of the invocation of a programmatic interface 1361, and the scheduling of a given job may in some cases depend upon the successful completion of at least a subset of the operations of an earlier-generated job. In one embodiment, a client may request that outlier detection be performed on the records of a stream in batch mode (e.g., instead of in real time, or in addition to outlier analysis performed in real time). In such a scenario, as indicated by arrow 1332, some or all of the stream data may be stored at a batched data repository. A given stream may be closed to further records in some cases before batch-mode outlier detection is performed; in other cases, batch mode analysis of older saved stream records may be performed concurrently with real-time analysis on newly arriving data. Each batch-mode analysis may be represented by a corresponding job object in the depicted embodiment.

In at least some implementations, job queue 1342 may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS customer). Asynchronously with respect to the submission of the requests 1311, the next job whose dependency requirements have been met may be removed from job queue 1342 in the depicted embodiment, as indicated by arrow 1313, and a processing plan comprising a workload distribution strategy may be identified for it. The workload distribution strategy layer 1375, which may also be a component of the MLS control plane as mentioned earlier, may determine the manner in which the lower level operations of the job are to be distributed among one or more compute servers (e.g., servers selected from pool 1385), and/or the manner in which the data analyzed or manipulated for the job is to be distributed among one or more storage devices or servers. As indicated by arrow 1335, the workload distribution strategy layer 1375 may also be utilized by real-time analytics manager 1381 in some embodiments, e.g., to help identify the set of servers to be used for the outlier detection algorithm. For example, in at least one embodiment portions of the outlier detection algorithm may be implemented in a parallelized manner (e.g., with the number of servers used in parallel selected based at least in part on the number of random cut trees being used, and/or based on the number of free servers available in pools 1385). Different trees may be processed at respective execution platforms in some implementations. After the processing plan has been generated and the appropriate set of resources to be utilized for the batch job or the real-time analysis has been identified, operations may be scheduled on the identified resources. Results of some batch jobs or real-time analyses may be stored as MLS artifacts within repository 1320 in some embodiments, as indicated by arrow 1347.

In the embodiment shown in FIG. 12, clients 1364 may be able to view at least a subset of the artifacts stored in repository 1320, e.g., by issuing read requests 1318. Results of real-time stream analytics 1395 (e.g., outlier scores for various stream data records) may be made available to clients 1364 from server pools 1385 via interfaces 1361 in some embodiments. Entries may be added to the knowledge base 1317 based on input received from clients in the depicted embodiment, and knowledge base entries may also be viewed by the clients in at least some embodiments, as indicate by arrow 1317. In some embodiments, a relatively straightforward language for feature processing specification may be supported, allowing MLS clients to create "recipes" indicating various feature processing steps that they wish to have applied on data sets. Such recipes may be specified in text format, and then compiled into executable formats that can be re-used with different data sets on different resource sets as needed, e.g., at feature processors 1362. Algorithm libraries 1363 may include a wide variety of machine learning, statistics and data analysis algorithms in addition to outlier detection techniques, such as various types of regression and classification algorithms, neural network algorithms, stochastic gradient descent algorithms, and the like. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS.

It is noted that in some embodiments, the random cut forest based technique described above for outlier detection may be applied to a data set which is not necessarily part of a stream—e.g., outliers within any large or small data set may be identified, or outlier scores for various data records of a static data set may be computed using the technique. Furthermore, in various embodiments the technique need not necessarily be implemented at a machine learning service or at a stream analytics service—instead, the technique may be implemented at one or more computing devices that are not affiliated with such network-accessible services. In one embodiment, the random cut forest-based outlier detection algorithm may be implemented without utilizing provider network or cloud-based resources. In another embodiment, the random cut forest-based outlier detection algorithm may be implemented as a subcomponent of a larger monitoring tool, such as a tool which continuously collects metrics associated with the operations of an e-commerce web site or a provider network's resource usage levels. In the case of the e-commerce web site, for example, metrics records such as the number of viewers of various products per minute, the number of products added to the catalog per minute, etc. may form the streaming data on which outlier detection is performed. In the case of a provider network's resource usage, the streaming data collected on a continuous basis and analyzed for outliers may include such metrics as the number of storage writes or reads per minute at a particular storage service, the number of network requests per minute from various physical or virtual servers, the CPU utilizations collected over selected intervals at various servers, and so on.

Methods for Outlier Detection

Figure 13:
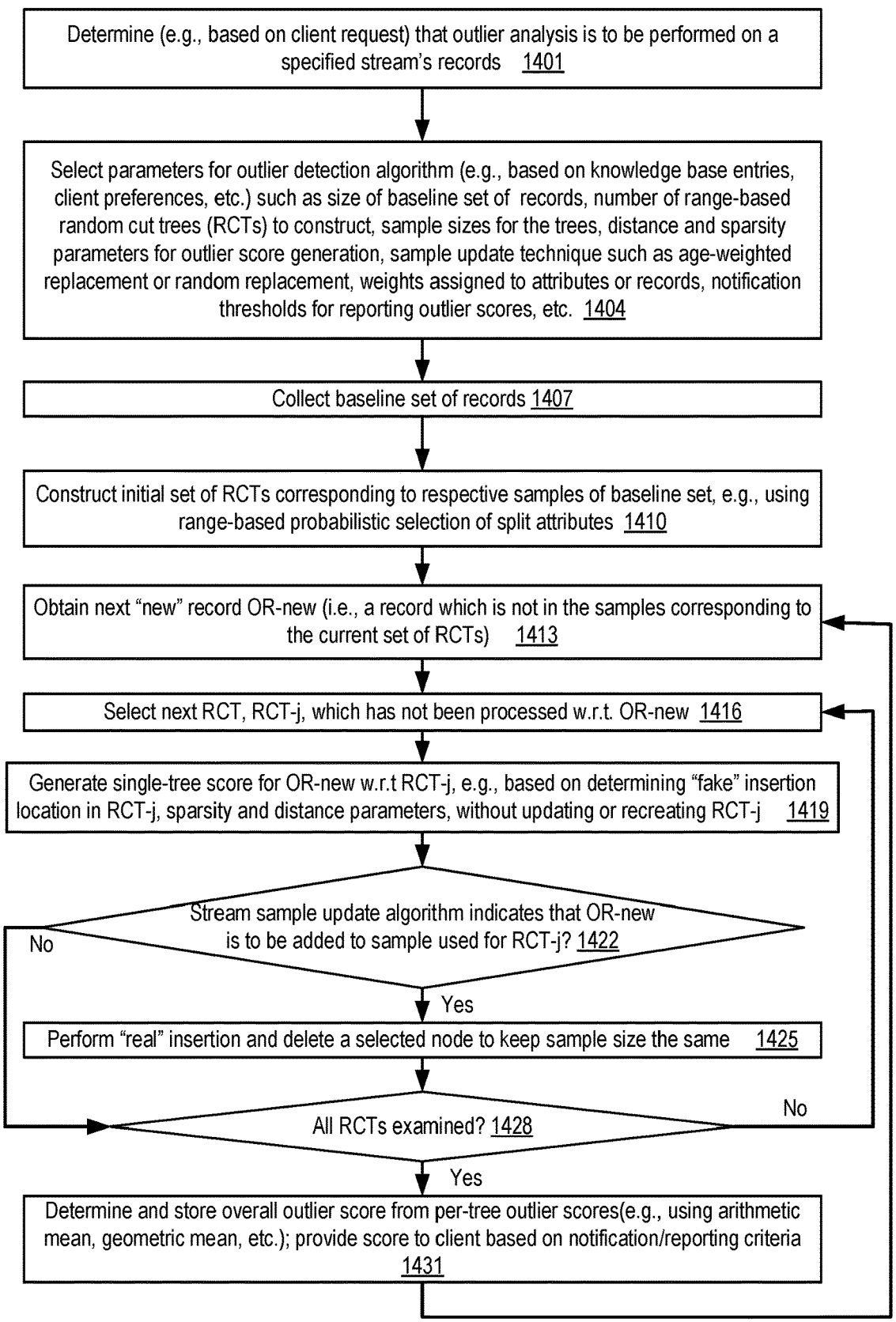
FIG. 13 illustrates aspects of operations that may be performed to implement an outlier detection algorithm for streaming observation records, according to at least some embodiments.

FIG. 13 illustrates aspects of operations that may be performed to implement an outlier detection algorithm for streaming observation records, according to at least some embodiments. As shown in element 1401, a determination that outlier analysis or detection is to be performed on records of a specified stream may be made, e.g., based on a request received from a client, or simply as part of the default statistical analysis on streaming data provided by an analytics service. Values of a number of parameters of an outlier detection algorithm may be selected (element 1404), e.g., based on preferences indicated by the client, knowledge base entries of the analytics service or machine learning service at which the stream is to be analyzed, or using default settings. The parameters may include, for example, the size of the baseline set of records to be collected to construct the initial range-based random cut trees, the number of trees to be constructed, the sample sizes to be used for the trees, distance and sparsity parameters for outlier score generation, sample update algorithm parameters (e.g., whether sample members are to be replaced using unweighted random selection, or whether some records are to be weighted more than others when deciding which records should be included in a sample), weights assigned to individual attributes (indicating the relative importance of some attributes relative to others when characterizing the records, e.g., from a client's perspective) or to data records, notification thresholds for reporting outlier scores/status, etc.

A baseline set of data records of the stream may be collected (element 1407), and an initial set of range-based random cut trees (RCTs) may be generated from respective samples of the baseline set (element 1410). A probabilistic iterative splitting strategy may be used to construct the trees, in which the bounding boxes of the tree nodes may be split at various stages along a selected dimension or attribute, and the dimension or attribute at a given stage may be selected at least partly based on the range of the attribute's values among the records which are to be split at that stage. For example, if a choice between two attributes Attr1 and Attr2 is to be made when splitting a collection of stream records, and Attr1 values vary between 100 and 200 in the collection while Attr2 values vary between 10 and 20, the probability of choosing Attr1 as the split attribute may be set to (200−100)/((200−100)+(20−10)) or 100/110. In other embodiments, other functions of attribute ranges may be used to select split attributes—e.g., the probability of selecting a given attribute may be proportional to the logarithm of its range. In some embodiments, respective outlier scores may be assigned to the nodes of the initial set of trees—e.g., based on the depths of the nodes in the trees, the relative isolation of the nodes, and so on.

After the initial set of trees is constructed, they may be used to perform outlier detection with respect to new, previously unseen data records of the stream. When the next record of the stream OR-new which is not represented in the current set of trees is received (element 1413), two types of operations may be performed: (a) outlier score calculations (which may involve "fake" inserts into some or all trees) and (b) sample updates, which may involve actual node inserts and deletions into some or all trees, and may be performed in accordance with probabilistic tree update algorithms. The order in which these two types of operations are performed may vary in different embodiments, or the two kinds of operations may be performed in parallel. In the embodiment depicted in FIG. 13, each tree may be considered one at a time, a local outlier score may be assigned to OR-new with respect to a given tree, a decision as to whether a sample update is to be performed for that tree may be made, and then the tree may be updated if the decision to insert a new node representing OR-new is made. In other embodiments, the decision as to whether to update the tree may be made before the local outlier score is calculated, so "fake" inserts may only be required if a real or true insert is not to be performed.

After the next tree RCT-j, which has not been processed with respect to OR-new is selected (element 1416), the local or single-tree outlier score for OR-new may be calculated for RCT-j based on the potential location of the node representing OR-new in RCT-j (element 1419) as determined in the "fake" insert. The fake insert may also involve one or more random split operations, with the split attribute being selected based at least partly on its value range as discussed earlier. A "fake" insert may differ from a true insert in that the changes resulting from a "fake" insert may not be saved or made permanent in the depicted embodiment. The local outlier score may be based on a combination of one or more characteristics of the potential insertion location in some embodiments—e.g., the depth of the corresponding node within the tree, the sparsity of neighbor nodes (e.g., nodes with a common parent or ancestor with respect to the potentially inserted node), and/or the minimum distance of other nodes from the potentially inserted node. In at least one embodiment, a local or tree-level outlier score may be generated for OR-new without necessarily traversing the tree all the way to a leaf node, or without determining the precise location of the potentially inserted node. For example, a score may be assigned based simply on determining (during the fake insert) that the node representing OR-new would be inserted at a depth greater than a threshold. In one implementation, for example, a threshold of depth 10 may be used, and a record for which a leaf node has not been inserted even though 10 levels of the tree have been traversed may simply be assigned a low outlier score.

The probabilistic stream sample update algorithm may be invoked to determine whether an actual insertion into RCT-j is to be performed with respect to OR-new (element 1422), i.e., whether the sample corresponding to RCT-j is to include OR-new or not. As mentioned earlier, in some embodiments the probability of inclusion of a given record such as OR-new in a sample may be independent of the record's arrival time or arrival sequence, while in other embodiments newer records may be assigned a higher probability of inclusion in a sample than older records. If a decision to include OR-new is made, a victim node representing a record which is to be deleted may be identified, and a true insert (which may result in the insertion of a node at the previously-identified potential insertion location) may be performed (element 1425) together with a corresponding delete to keep the sample size unchanged. The order in which the insert is performed relative to the delete may vary in different implementations. If the probabilistic sample update algorithm indicates that RCT-j is not to be updated (as also detected in operations corresponding to element 1422), and additional trees remain to be examined (as detected in element 1428) the operations corresponding to elements 1416-1428 may be repeated for the next tree. After all the trees have been examined with respect to OR-new, an overall outlier score may be determined from the per-tree scores (element 1431). For example, the arithmetic mean of the per-tree scores, or the geometric mean, or the median, may be used to generate the overall outlier score in some implementations. The score may be stored in a persistent repository and/or provided to the client on whose behalf the outlier detection is being performed based on the client's reporting or notification criteria. In some embodiments, feedback may be obtained from clients regarding the outlier scores generated. For example, if a client disagrees, based on their expertise in the domain for which streaming data is being collected, with a high outlier score assigned to a given record, the client may indicate their disagreement (and perhaps provide an explanation). Such feedback or evaluation of the quality of the analysis may be stored in a knowledge base and/or used to modify parameters of the outlier detection algorithm in some embodiments. In at least one embodiment, a client may not necessarily want outlier scores to be generated for all data records—instead, a client may ask that outlier results be provided only for specified observations. In one such scenario, the analytics service responsible for outlier detection may still construct and update random cut trees as discussed above, but may assign scores only to records for which specific requests have been received.

It is noted that in various embodiments, some of the operations shown in FIG. 13 may be implemented in a different order than that shown in the figure, or may be performed in parallel rather than sequentially. For example, the computations associated with a given tree may be performed in parallel with the computations associated with a different tree in some embodiments, assuming that a sufficient set of execution platforms (such as machine learning servers) is available. Additionally, some of the operations shown in FIG. 13 may not be required in one or more implementations.

Use Cases

The techniques described above, of rapidly and efficiently performing outlier detection on streaming data records, may be useful in a variety of environments. Identifying anomalous or unusual data among fast-arriving records may be critical for fraud detection, intrusion detection, proactive responses to potential failures in hardware systems, appliances or automobiles, and the like. Retailing organizations may be able to isolate drops in order rates and react accordingly using the outlier detection algorithms discussed. A number of health-related applications may also benefit from such techniques, e.g., to identify unusual heart behavior before heart attacks, unusual blood chemistry levels before diseases such as diabetes become severe, and so on. Using resources of a provider network at which a machine learning service or a stream analysis service is implemented may allow large amounts of computing resources to be dedicated in a flexible manner to outlier detection, and may allow knowledge gained from previous experience to be shared to improve the results obtained in subsequent outlier analyses. In some cases, the outlier detection algorithm may be implemented as a subcomponent of a larger monitoring facility or tool associated with an e-commerce website and/or a provider network. The outliers detected at such a tool may for example help to generate quick (or even proactive) responses to potentially problematic situations such as resource overloads or non-responsive services.

Illustrative Computer System

Figure 14:
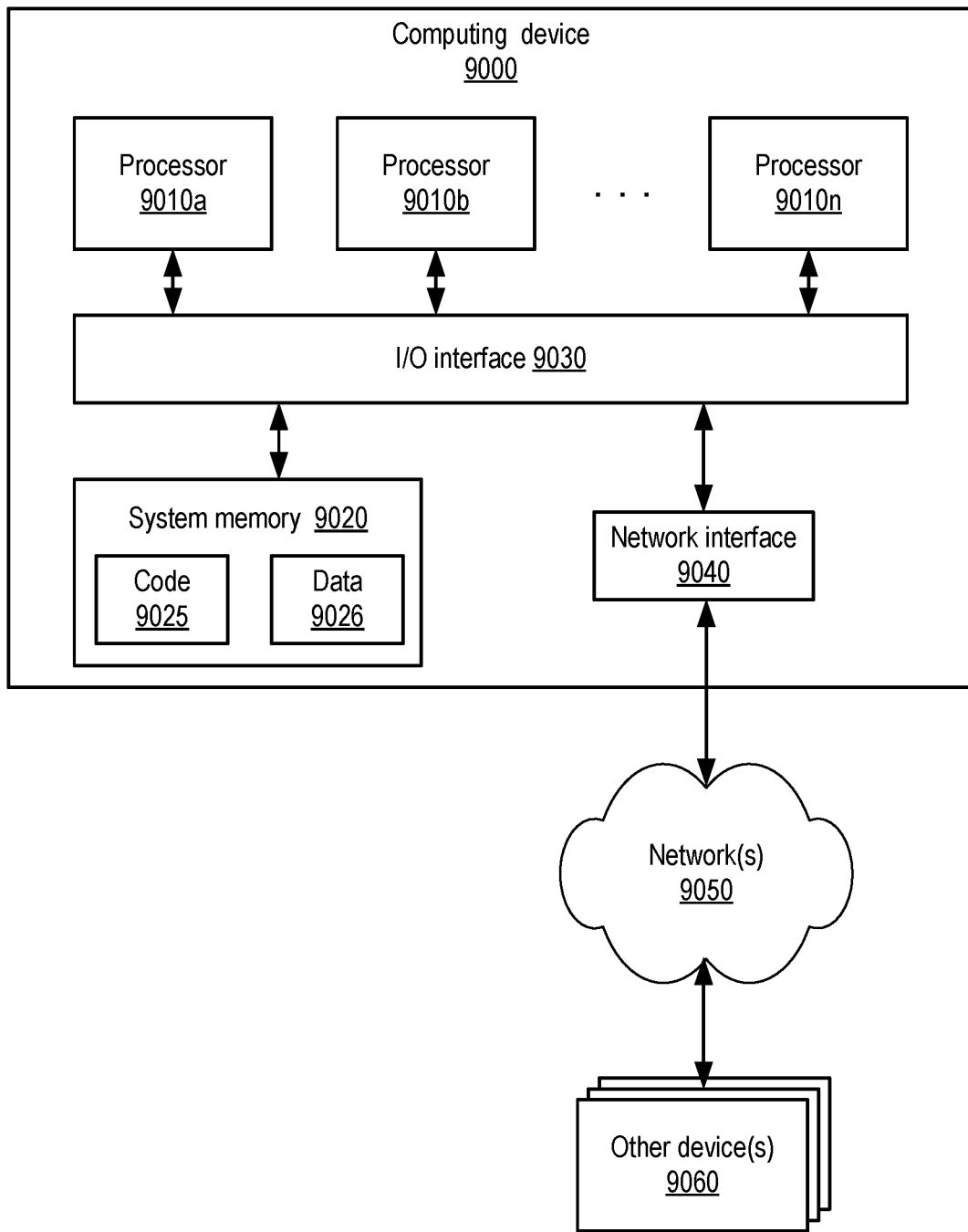
FIG. 14 is a block diagram illustrating an example computing device that may be used in at least some embodiments.

In at least some embodiments, a server that implements one or more of the techniques described above for outlier detection (including for example real-time analytics managers, execution platforms and other components of a machine learning service, or various components of a stream management and analysis system) may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A computer-implemented method, comprising:
receiving a request, from a client, via one or more programmatic interfaces of a service of a provider network, to perform outlier detection on records of a streaming data source;
determining, by the service of the provider network, one or more operations for performing the requested outlier detection on the records of the streaming data source;
dynamically provisioning, by the service of the provider network, one or more computing resources in the provider network for performing the request, based at least, on a distribution for the determined one or more operations;
distributing performance of the requested outlier detection amongst the dynamically provisioned one or more computing resources based, at least in part, on the determined one or more operations for performing the requested outlier detection; and wherein the dynamically provisioned one or more computing resources perform:

providing a first outlier score for a particular record of the records of the data stream via the one or more programmatic interfaces, wherein the first outlier score is computed using a first set of data structures derived from a subset of contents of the records of the data stream; and receiving a set of additional records of the data stream after the first outlier score is computed; and in response to receiving the set of additional records of the streaming data source, determining, by the service of the provider network, one or more additional operations for performing the requested outlier detection on the received set of additional records;

distributing the performance of the requested outlier detection, including the set of additional records, among the dynamically provisioned one or more computing resources, based, at least in part, on the determined one or more additional operations; and wherein the dynamically provisioned one or more computing resources perform:

modifying at least some data structures of the first set based at least on a subset of contents of the set of additional records;

computing a second outlier score for the particular record using at least one modified data structure of the first set; and in response to determining that a difference between the second outlier score and the first outlier score exceeds a threshold, providing the second outlier score via the one or more programmatic interfaces.

2. The computer-implemented method as recited in claim 1, wherein the first set of data structures comprises a random cut tree.

3. The computer-implemented method as recited in claim 1, further comprising:

obtaining, via the one or more programmatic interfaces, an indication of a parameter to be used to compute outlier scores for records of the data stream, wherein the first outlier score is computed using the parameter.

4. The computer-implemented method as recited in claim 1, wherein modifying a particular data structure of the first set of data structures comprises:

assigning, to a particular record of the set of additional records, a probability of inclusion of a representation of the particular record within the particular data structure, wherein the probability is based at least in part on a time at which the particular record is received; and including, based at least in part on the probability, the representation of the particular record within the particular data structure.

5. The computer-implemented method as recited in claim 1, wherein modifying a particular data structure of the first set of data structures comprises (a) inserting a representation of a particular record into the particular data structure and (b) removing a representation of another record from the particular data structure.

6. The computer-implemented method as recited in claim 1, further comprising:

computing the first outlier score from a first per-data-structure score and a second per-data-structure score, wherein the first per-data-structure score is generated from a first data structure of the first set of data structures, and wherein the second per-data-structure score is generated from a second data structure of the first set of data structures.

7. The computer-implemented method as recited in claim 1, further comprising:

computing the first outlier score based at least in part on a potential insertion location identified for the particular record within a data structure of the first set.

8. A system, comprising:

one or more computing devices;

wherein the one or more computing devices include instructions that upon execution on or across the one or more computing devices implement a service of a provider network, wherein the service is configured to:

receive a request, from a client, via one or more programmatic interfaces of the service of the provider network, to perform outlier detection on records of a streaming data source;

determine, by the service of the provider network, one or more operations for performing the requested outlier detection on the records of the streaming data source;

dynamically provision, by the service of the provider network, one or more computing resources of the provider network, to perform the request, based at least, on a distribution for the determined one or more operations;

distribute performance of the requested outlier detection amongst the dynamically provisioned one or more computing resources based, at least in part, on the determined one or more operations for performing the requested outlier detection; and wherein the dynamically provisioned one or more computing resources perform:

provide a first outlier score for a particular record of the records of the data stream via the one or more programmatic interfaces, wherein the first outlier score is computed using a first set of data structures derived from a subset of contents of the records of the data stream; and receive a set of additional records of the streaming data source after the first outlier score is computed; and in response to receiving the set of additional records of the streaming data source, determine, by the service of the provider network, one or more additional operations for performing the requested outlier detection on the received set of additional records;

distribute the performance of the requested outlier detection, including the set of additional records, among the dynamically provisioned one or more computing resources, based, at least in part, on the determined one or more additional operations; and wherein the dynamically provisioned one or more computing resources perform:

modify at least some data structures of the first set based at least on a subset of contents of the set of additional records;

compute a second outlier score for the particular record using at least one modified data structure of the first set; and in response to determining that a difference between the second outlier score and the first outlier score exceeds a threshold, provide the second outlier score via the one or more programmatic interfaces.

9. The system as recited in claim 8, wherein the first set of data structures comprises a random cut tree.

10. The system as recited in claim 8, wherein the one or more computing devices include further instructions that upon execution on or across the one or more computing devices:
  obtain, via the one or more programmatic interfaces, an indication of a parameter to be used to compute outlier scores for records of the data stream, wherein the first outlier score is computed using the parameter.

11. The system as recited in claim 8, wherein to modify a particular data structure of the first set of data structures, the one or more computing devices include further instructions that upon execution on or across the one or more computing devices:
  assign, to a particular record of the set of additional records, a probability of inclusion of a representation of the particular record within the particular data structure, wherein the probability is based at least in part on a time at which the particular record is received; and
  include, based at least in part on the probability, the particular record within the particular data structure.

12. The system as recited in claim 8, wherein to modify a particular data structure of the first set of data structures, the one or more computing devices include further instructions that upon execution on or across the one or more computing devices:
  insert a representation of a particular record into the particular data structure; and
  remove a representation of another record from the particular data structure.

13. The system as recited in claim 8, wherein the one or more computing devices include further instructions that upon execution on or across the one or more computing devices:
  determine the first outlier score from a first per-data-structure score and a second per-data-structure score, wherein the first per-data-structure score is generated from a first data structure of the first set of data structures, and wherein the second per-data-structure score is generated from a second data structure of the first set of data structures.

14. The system as recited in claim 8, wherein the one or more computing devices include further instructions that upon execution on or across the one or more computing devices:
  determine the first outlier score based at least in part on a potential insertion location identified for the particular record within a data structure of the first set.

15. One or more non-transitory computer-readable storage media storing program instructions that when executed on or across one or more processors:
  receive a request, from a client, via one or more programmatic interfaces of a service of a provider network, to perform outlier detection on records of a streaming data source; and
  in response to receiving the stream of records of the streaming data source:
    determine, by the service of the provider network, one or more operations for performing the requested outlier detection on the records of the streaming data source;
    dynamically provision, by the service of the provider network, one or more computing resources in the provider network for performing the request; and
    distributing performance of the requested outlier detection amongst the dynamically provisioned one or more computing resources based, at least in part, on the determined one or more operations for performing the requested outlier detection; and
  wherein the dynamically provisioned one or more computing resources perform:
    provide a first outlier score for a particular record of the records of the data stream to be presented via the one or more programmatic interfaces, wherein the first outlier score is computed using a first set of data structures derived from a subset of contents of the records of the data stream; and
    receive a set of additional records of the streaming data source after the first outlier score is computed; and
  in response to receiving the set of additional records of the streaming data source:
    determine one or more additional operations for performing the requested outlier detection on the received set of additional records; and
    distributing the performance of the requested outlier detection, including the set of additional records, among the dynamically provisioned one or more computing resources, based, at least in part, on the determined one or more set of additional operations; and
  wherein the dynamically provisioned one or more computing resources perform:
    modify at least some data structures of the first set based at least on a subset of contents of the additional records;
    compute a second outlier score for the particular record using at least one modified data structure of the first set; and
    in response to determining that a difference between the second outlier score and the first outlier score exceeds a threshold, provide the second outlier score via the one or more programmatic interfaces.

16. The one or more non-transitory readable storage media as recited in claim 15, wherein the first set of data structures comprises a random cut tree.

17. The one or more non-transitory readable storage media as recited in claim 15, storing further program instructions that when executed on or across the one or more processors:
  obtain, via the one or more programmatic interfaces, an indication of a parameter to be used to compute outlier scores for records of the data stream, wherein the first outlier score is computed using the parameter.

18. The one or more non-transitory readable storage media as recited in claim 15, wherein to modify a particular data structure of the first set of data structures, the one or more non-transitory readable storage media store further program instructions that when executed on or across the one or more processors:
  assign, to a particular record of the set of additional records, a probability of inclusion of a representation of the particular record within the particular data structure, wherein the probability is based at least in part on a time at which the particular record is received; and
  include, based at least in part on the probability, the particular record within the particular data structure.

19. The one or more non-transitory readable storage media as recited in claim 15, wherein to modify a particular data structure of the first set of data structures, the one or more non-transitory readable storage media store further program instructions that when executed on or across the one or more processors:
  insert a representation of a particular record into the particular data structure; and remove a representation of another record from the particular data structure.

20. The one or more non-transitory readable storage media as recited in claim 15, storing further program instructions that when executed on or across the one or more processors:
  determine the first outlier score from a first per-data-structure score and a second per-data-structure score, wherein the first per-data-structure score is generated from a first data structure of the first set of data structures, and wherein the second per-data-structure score is generated from a second data structure of the first set of data structures.

* * * * *